US011080426B2

(12) United States Patent
Park et al.

(10) Patent No.: US 11,080,426 B2
(45) Date of Patent: *Aug. 3, 2021

(54) BUILDING SYSTEM WITH SMART ENTITY PERSONAL IDENTIFYING INFORMATION (PII) MASKING

(71) Applicant: Johnson Controls Technology Company, Auburn Hills, MI (US)

(72) Inventors: Youngchoon Park, Brookfield, WI (US); Sudhi R. Sinha, Milwaukee, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/570,845

(22) Filed: Sep. 13, 2019

(65) Prior Publication Data

US 2020/0104530 A1    Apr. 2, 2020

Related U.S. Application Data

(63) Continuation of application No. 16/048,052, filed on Jul. 27, 2018, now Pat. No. 10,417,451.

(Continued)

(51) Int. Cl.
*G06F 21/00* (2013.01)
*G06F 21/62* (2013.01)
(Continued)

(52) U.S. Cl.
CPC ......... *G06F 21/6254* (2013.01); *G05B 15/02* (2013.01); *G06F 16/2255* (2019.01);
(Continued)

(58) Field of Classification Search
CPC ................. G06F 21/6254; G06F 16/2379
(Continued)

(56) References Cited

U.S. PATENT DOCUMENTS 8,516,016 B2    8/2013   Park et al.
8,532,808 B2    9/2013   Drees et al.
(Continued)

FOREIGN PATENT DOCUMENTS

WO    WO-2011/100255 A2    8/2011

OTHER PUBLICATIONS

Extended European Search Report issued in EP Application No. 18196948.6 dated Apr. 10, 2019, 9 pages.
(Continued)

*Primary Examiner* — Anthony D Brown
(74) *Attorney, Agent, or Firm* — Foley & Lardner LLP

(57) ABSTRACT

A building system for operating a building and managing private building information includes a processing circuit configured to receive a request for information for a building entity of a building entity database. The processing circuit is configured to select one of the mask templates from the entity database based on access values associated with the requesting device and a relational link between the building entity and the mask templates, retrieve private information for the building entity in response to a reception of the request for the information, and generate a masked information data structure based on the private information and the one of the mask templates.

20 Claims, 26 Drawing Sheets

Related U.S. Application Data

(60) Provisional application No. 62/564,247, filed on Sep. 27, 2017, provisional application No. 62/611,974, filed on Dec. 29, 2017, provisional application No. 62/611,984, filed on Dec. 29, 2017.

(51) Int. Cl.
   *H04L 29/06* (2006.01)
   *G05B 15/02* (2006.01)
   *G06F 16/28* (2019.01)
   *G06F 16/22* (2019.01)
   *G06F 16/23* (2019.01)

(52) U.S. Cl.
   CPC ........ *G06F 16/2379* (2019.01); *G06F 16/288* (2019.01); *H04L 63/101* (2013.01); *G05B 2219/2614* (2013.01); *G05B 2219/2642* (2013.01); *H04L 2209/04* (2013.01)

(58) Field of Classification Search
   USPC ......................................................... 726/26
   See application file for complete search history.

(56) References Cited

U.S. PATENT DOCUMENTS

| | | | |
|---|---|---|---|
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,788,097 | B2 | 7/2014 | Drees et al. |
| 8,843,238 | B2 | 9/2014 | Wenzel et al. |
| 9,196,009 | B2 | 11/2015 | Drees et al. |
| 9,286,582 | B2 | 3/2016 | Drees et al. |
| 9,354,968 | B2 | 5/2016 | Wenzel et al. |
| 9,753,455 | B2 | 9/2017 | Drees |
| 2005/0154494 | A1 | 7/2005 | Ahmed |
| 2006/0271589 | A1 | 11/2006 | Horowitz et al. |
| 2010/0281387 | A1 | 11/2010 | Holland et al. |
| 2011/0125737 | A1* | 5/2011 | Pothering .............. G06F 16/832 707/728 |
| 2013/0060820 | A1 | 3/2013 | Bulusu et al. |
| 2015/0019174 | A1 | 1/2015 | Kiff et al. |
| 2015/0168931 | A1* | 6/2015 | Jin .......................... H04L 12/12 700/90 |
| 2017/0053441 | A1 | 2/2017 | Nadumane et al. |
| 2017/0315697 | A1 | 11/2017 | Jacobson et al. |
| 2018/0048485 | A1* | 2/2018 | Pelton ..................... F24F 11/62 |

OTHER PUBLICATIONS

Metadata Schema for Buildings, Brickschema.org, Retrieved Dec. 24, 2019, 3 pages.
Balaji et al, "Brick: Towards a Unified Metadata Schema for Buildings," dated Nov. 16-17, 2016, 10 pages.
Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, the Bad and the Ugly, ACM, dated Nov. 4-5, 2015, 4 pages.
Brick: Towards a Unified Metadata Schema for Buildings, dated Nov. 16, 2016, 46 pages.
Building Blocks for Smart Buildings, BrickSchema.org, dated Mar. 2019, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
Koh et al., "Scrabble: Transferrable Semi-Automated Semantic Metadata Normalization using Intermediate Representation," dated Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Metadata Schema for Buildings, 3 pages, Brickschema.org (Cannot confirm date.).

* cited by examiner

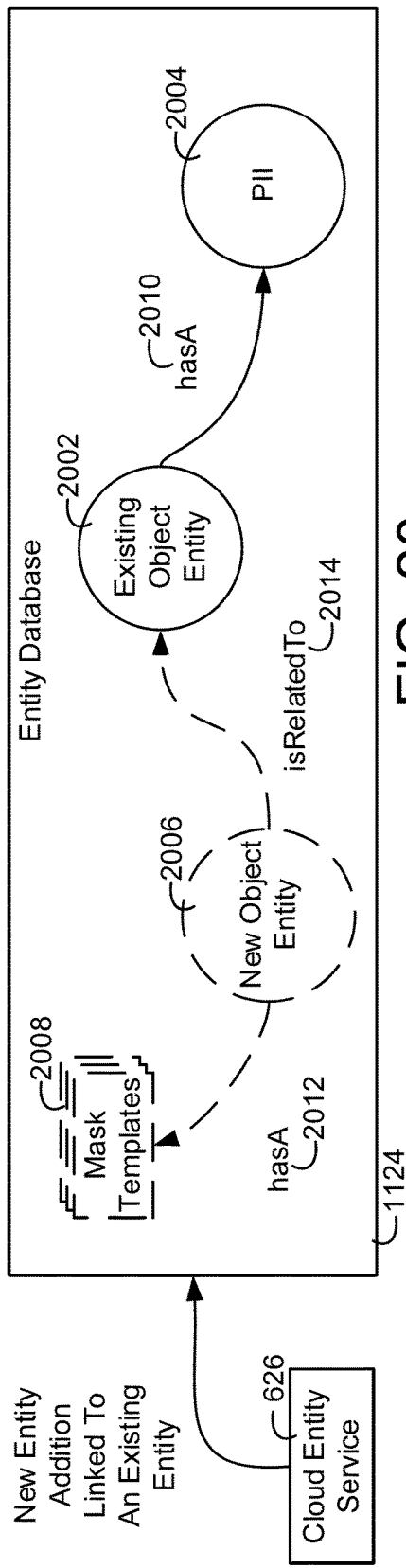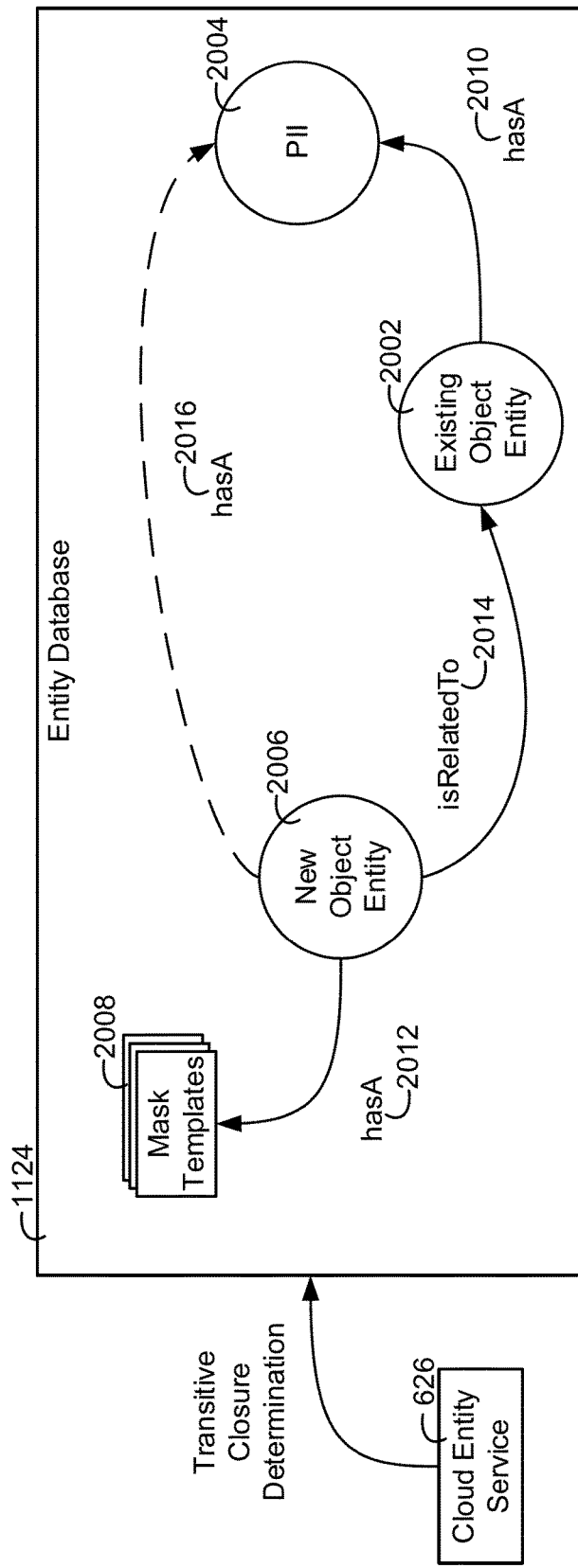
FIG. 20
FIG. 21

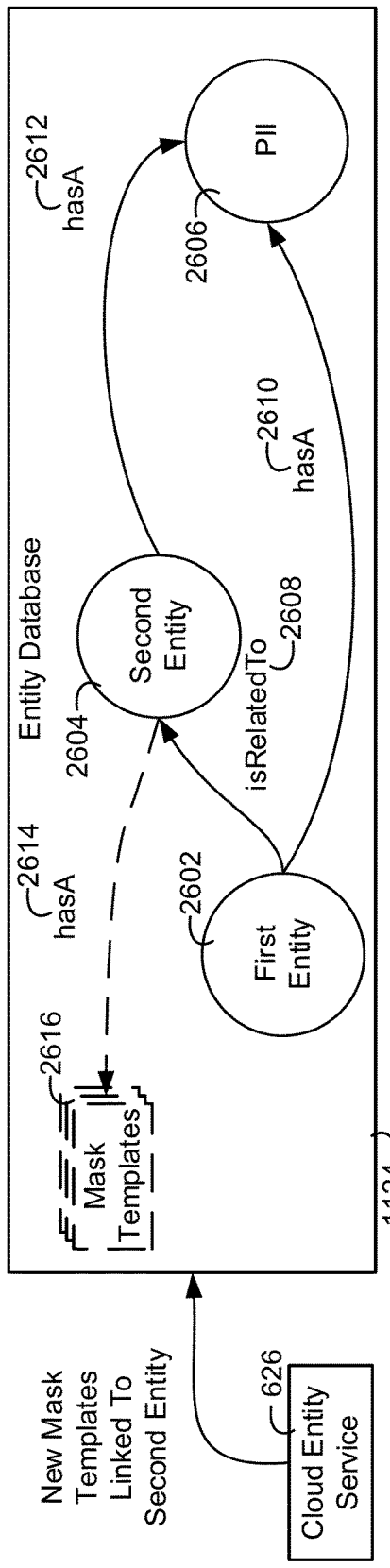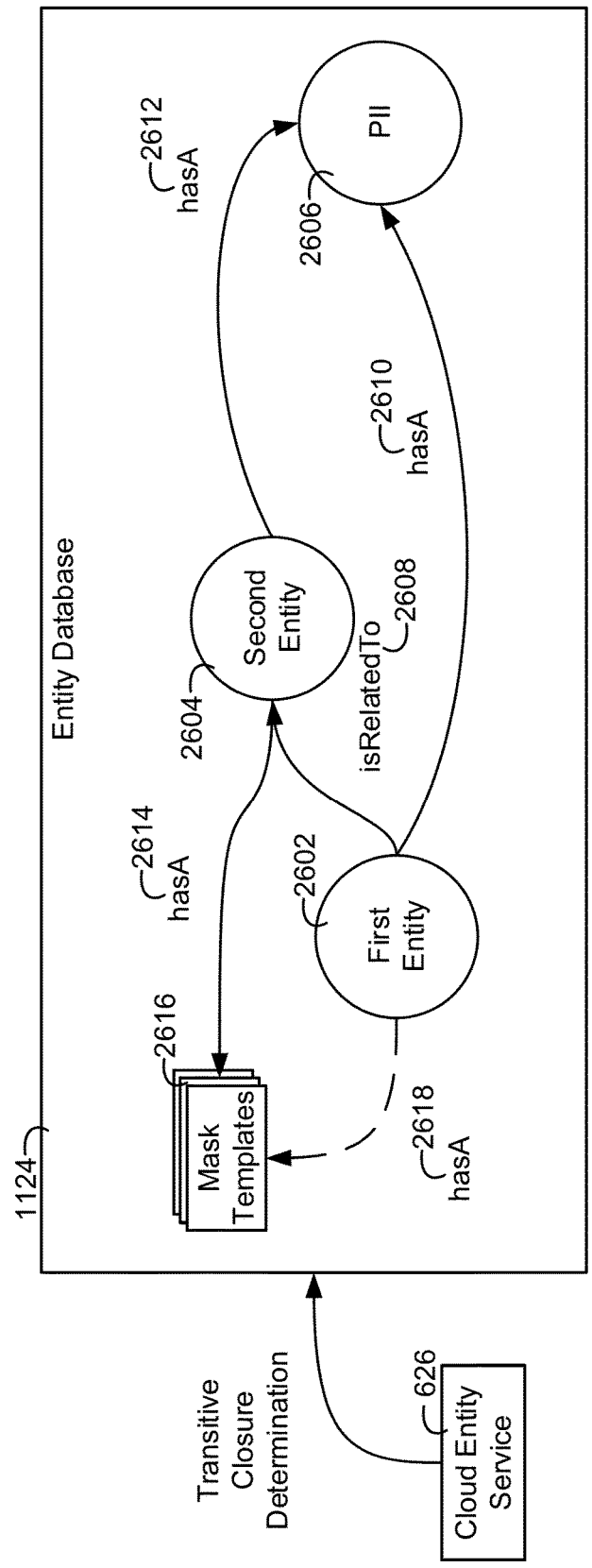

BUILDING SYSTEM WITH SMART ENTITY PERSONAL IDENTIFYING INFORMATION (PII) MASKING

CROSS-REFERENCE TO RELATED PATENT APPLICATIONS

This application claims the benefit of and priority to U.S. Non-Provisional patent application Ser. No. 16/048,052 filed Jul. 27, 2018 which claims benefit of U.S. Provisional Patent Application No. 62/564,247 filed Sep. 27, 2017, U.S. Provisional Patent Application No. 62/611,984 filed Dec. 29, 2017, and U.S. Provisional Patent Application No. 62/611,974 filed Dec. 29, 2017. The entirety of each of these patent applications is incorporated by reference herein.

BACKGROUND

The present disclosure relates generally to a building management system and more particularly to building information management of a building management system that collects, manages, and protects data for interconnected devices and other entities. The present disclosure relates specifically to a building system configured to manage private information associated with a building.

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. As the number of BMS devices used in various sectors increases, the amount of data being produced and collected has been increasing exponentially. Accordingly, effective analysis and information management of a plethora of collected data is desired.

SUMMARY

One implementation of the present disclosure is a building system for operating a building and managing private building information. The building system includes a processing circuit configured to receive a request for information for a building entity of a building entity database, wherein the building entity database includes the building entity, mask templates, and a relational link between the building entity and the mask templates. The processing circuit is configured to select one of the mask templates from the entity database based on access values associated with the requesting device and the relational link between the building entity and the mask templates. The processing circuit is configured to retrieve private information for the building entity in response to a reception of the request for the information, and generate a masked information data structure based on the private information and the one of the mask templates.

In some embodiments, the processing circuit is configured to operate one or more pieces of building equipment to operate the building based on the masked information data structure.

In some embodiments, the processing circuit is configured to select the one of the mask templates by selecting the one of the mask templates based on the access values.

In some embodiments, each of the mask templates is associated with a particular combination of values of the access values. In some embodiments, the processing circuit is configured to select the one of the mask templates by selecting the one of the mask templates based on the particular combination of values of the access values by identifying the one of the mask templates associated with the particular combination of the values of the access values.

In some embodiments, the processing circuit is configured to determine whether the request for information is a request for the private information or a request for public information and retrieve the public information and provide the public information to the requesting device without masking in response to a determination that the request for information is the request for the public information. In some embodiments, the processing circuit is configured to retrieve the private information for the building entity in response to the reception of the request for the information and in response to a determination that the request for the information is the request for the private information. In some embodiments, the processing circuit is configured to generate the masked information data structure based on the retrieved private information and the selected one of the mask templates in response to the determination that the request for the information is the request for the private information.

In some embodiments, the private information includes attributes of the building entity. In some embodiments, each of the mask templates includes masking operators, one of the masking operators associated with each of the attributes. In some embodiments, the masking operators include at least one of a masking operator configured to replace one or more values of a particular attribute with a particular masking character, a masking operator configured to show the particular attribute in the clear, a masking operator configured to show only a particular number of values of the attribute, or a masking operator configured to apply a particular encryption method on the particular attribute.

In some embodiments, the access values include at least one of role information of a user of the requesting device, wherein the role information indicates a permission level of the user, a device type of the requesting device, a geographic location of the requesting device, an application of the requesting device associated with generating the request for private information, or a vertical identifying a business use associated with the requesting device.

In some embodiments, the processing circuit is configured to receive a mask template request from a second system, the second system configured to store the private information and mask the private information based on a mask template received from the building system, select a second mask template of the mask templates based on the mask template request received from the second system, and send the second mask template to the second system for masking, by the second system, the private information stored by the second system.

In some embodiments, the processing circuit is configured to generate an access hash key based on the access values. In some embodiments, the processing circuit is configured to select the one of the mask templates from the entity database based on the access values by selecting the one of the mask templates with the access hash key. In some embodiments, each of the mask templates is associated with a particular value of the access hash key.

In some embodiments, the processing circuit is configured to generate the access hash key by concatenating the access values and hashing the concatenated access values to generate the access hash key.

In some embodiments, the processing circuit is configured to determine a transitive closure for the entity database based on a set of entities of the entity database and a set of relational links between entities of the set of entities, the set of entities including at least the building entity, the mask templates, and the private information and update the entity database based on the transitive closure by adding additional relational links between the entities of the set of entities, the additional relational links including at least one of the relational link between the building entity and the one or more mask templates and a relational link between the building entity and the private information. In some embodiments, the processing circuit is configured to retrieve the private information for the building entity in response to the reception of the request for the information based on the relational link between the building entity and the private information.

In some embodiments, the processing circuit is configured to receive new entity data, the new entity data including at least one of a new building entity and a new link between the new building entity and at least one of the entities of the set of entities, new private information and a new link between the new private information and at least one of the entities of the set of entities, or new mask templates and a new link between the new mask templates and at least one of the entities of the set of entities, add the new entity data to the entity database, determine the transitive closure of the entity database based on the set of entities, the set of relational links, and the new entity data added to the entity database, and update the entity database by updating the set of relational links based on the transitive closure by adding new direct relational links between the entities of the set of entities to the set of relational links.

In some embodiments, the building entity database includes a second building entity and one or more links relating the building entity to the second building entity and the second building entity to the building entity. In some embodiments, the processing circuit is configured to receive a second request for the private information for the building entity and second private information for the second entity linked to the building entity, determine whether a requesting device has access to the second private information of the second entity linked to the building entity and the private information of the building entity based on the access values, generate a second masked information data structure based on second private information and a second mask template, and provide the second masked information data structure to the requesting device in response the reception of the request for the private information and the second private information and in response to a determination that the requesting device has access to the second private information of the second entity linked to the building entity and the private information of the building entity based on the access values.

In some embodiments, the building entity database includes one or more access control lists (ACL) linked to at least one of the building entity or the second building entity, wherein the one or more ACLs indicate whether a role indicated by the access values is associated with access to the second private information of the second building entity linked to the building entity and the private information of the building entity. In some embodiments, the processing circuit is configured to determine whether the requesting device has access to the second private information of the second building entity linked to the building entity and the private information of the building entity based on the role indicated by the access values and the one or more ACLs.

In some embodiments, the building entity database includes second mask templates and one or more links associating the second mask templates with the second building entity. In some embodiments, the processing circuit is configured to generate the second masked information data structure based on the second private information and the second mask template by selecting the second mask template from the second mask templates based on the access values and applying one or more masking operators of the second mask template to attributes of the second private information.

In some embodiments, the first mask templates and the second mask templates are same mask templates.

Another implementation of the present disclosure is a method for managing private information of smart entities of a smart entity database. The method includes receiving a request for information for a building entity of the building entity database from a requesting device, wherein the building entity database includes the building entity, mask templates, and the relational link between the building entity and the mask templates. The method includes selecting one of the mask templates from the entity database based on the access values associated with the requesting device and the relational link between the building entity and the mask templates. The method further includes retrieving private information for the building entity in response to a reception of the request for the information, generating a masked information data structure based on the private information and the one of the mask templates, and providing the masked information data structure to the requesting device in response to the reception of the request for the information.

In some embodiments, selecting the one of the mask templates includes selecting the one of the mask templates based on the access values templates based on the particular combination of values of the access values by identifying the one of the mask templates associated with the particular combination of the values of the access values. In some embodiments, each of the mask templates is associated with a particular combination of values of the access values.

In some embodiments, the private information includes attributes of the building entity. In some embodiments, each of the mask templates includes masking operators, one of the masking operators associated with each of the attributes. In some embodiments, the masking operators include at least one of a masking operator configured to replace one or more values of a particular attribute with a particular masking character, a masking operator configured to show the particular attribute in the clear, a masking operator configured to show only a particular number of values of the attribute, or a masking operator configured to apply a particular encryption method on the particular attribute.

In some embodiments, the access values include at least one of role information of a user of the requesting device, wherein the role information indicates a permission level of the user, a device type of the requesting device, a geographic location of the requesting device, an application of the requesting device associated with generating the request for private information, or a vertical identifying a business use associated with the requesting device.

In some embodiments, the building entity database includes a second building entity and one or more links relating the building entity to the second building entity and the second building entity to the building entity. In some embodiments, the method further includes receiving a second request for the private information for the building entity and second private information for the second entity linked to the building entity, determining whether the requesting device has access to the second private information of the second entity linked to the building entity and the private information of the building entity based on the access values, generating a second masked information data structure based on second private information and a second mask template, and providing the second masked information data structure to the requesting device in response the reception of the request for the private information and the second private information and in response to a determination that the requesting device has access to the second private information of the second entity linked to the building entity and the private information of the building entity based on the access values.

In some embodiments, the building entity database includes one or more access control lists (ACL) linked to at least one of the building entity or the second building entity, wherein the one or more ACLs indicate whether a role indicated by the access values is associated with access to the second private information of the second building entity linked to the building entity and the private information of the building entity. In some embodiments, the method further includes determining whether the requesting device has access to the second private information of the second building entity linked to the building entity and the private information of the building entity based on the role indicated by the access values and the one or more ACLs.

In some embodiments, the building entity database includes second templates and one or more links associating the second mask templates with the second building entity. In some embodiments, generating the second masked information data structure based on the second private information and the second mask template include selecting the second mask template from the second mask templates based on the access values and applying one or more masking operators of the second mask template to attributes of the second private information.

In some embodiments, the building entity database includes a second building entity and one or more links relating the building entity to the second building entity and the second building entity to the building entity. In some embodiments, the method further includes receiving a second request for the private information for the building entity and second private information for the second entity linked to the building entity, determining whether the requesting device has access to the second private information of the second entity linked to the building entity and the private information of the building entity based on the access values, generating a second masked information data structure based on second private information and a second mask template, and providing the second masked information data structure to the requesting device in response the reception of the request for the private information and the second private information and in response to a determination that the requesting device has access to the second private information of the second entity linked to the building entity and the private information of the building entity based on the access values.

In some embodiments, the method includes determining a transitive closure for the entity database based on a set of entities of the entity database and a set of relational links between entities of the set of entities, the set of entities including at least the building entity, the mask templates, and the private information and updating the entity database based on the transitive closure by adding additional relational links between the entities of the set of entities, the additional relational links including at least one of the relational link between the building entity and the one or more mask templates and a relational link between the building entity and the private information. In some embodiments, the method includes retrieving the private information for the building entity in response to the reception of the request for the information is based on the relational link between the building entity and the private information.

In some embodiments, the method includes receiving new entity data, the new entity data including at least one of a new building entity and a new link between the new building entity and at least one of the entities of the set of entities, new private information and a new link between the new private information and at least one of the entities of the set of entities, or new mask templates and a new link between the new mask templates and at least one of the entities of the set of entities, adding the new entity data to the entity database, determining the transitive closure of the entity database based on the set of entities, the set of relational links, and the new entity data added to the entity database, and updating the entity database by updating the set of relational links based on the transitive closure by adding new direct relational links between the entities of the set of entities to the set of relational links.

Another implementation of the present disclosure is an information management system for a building. The information management system includes a building entity database including a building entity, mask templates, and the relational link between the building entity and the mask templates. The system includes a processing circuit configured to receive a request for information for a building entity of the building entity database from a requesting device, select one of the mask templates from the entity database based on access values associated with the requesting device and the relational link between the building entity and the mask templates, wherein the one of the mask templates includes masking operators, one of the masking operators associated with each of attributes of the information. The processing circuit is configured to retrieve the information for the building entity in response to a reception of the request for the information, wherein the information includes the attributes. The processing circuit is configured to generate a masked information data structure based on the retrieved information and the selected one of the mask templates by applying each of the masking operators to the attribute associated with the masking operator and provide the masked information data structure to the requesting device in response to the reception of the request for the information.

In some embodiments, the processing circuit is configured to select the one of the mask templates by selecting the one of the mask templates as a function of the access values.

In some embodiments, each of the mask templates is associated with a particular combination of values of the access values. In some embodiments, the processing circuit is configured to select the one of the mask templates by selecting the one of the mask templates based on the particular combination of values of the access values by identifying the one of the mask templates associated with the particular combination of the values of the access values.

In some embodiments, the masking operators include at least one of a masking operator configured to replace one or more values of a particular attribute of the attributes with a particular masking character, a masking operator configured to show the particular attribute in the clear, a masking operator configured to show only a particular number of values of the attribute, or a masking operator configured to apply a particular encryption method on the particular attribute.

In some embodiments, the processing circuit is configured to determine a transitive closure for the entity database based on a set of entities of the entity database and a set of relational links between entities of the set of entities, the set of entities including at least the building entity, the mask templates, and the private information and update the entity database based on the transitive closure by adding additional relational links between the entities of the set of entities, the additional relational links including at least one of the relational link between the building entity and the one or more mask templates and a relational link between the building entity and the private information. In some embodiments, the processing circuit is configured to retrieve the private information for the building entity in response to the reception of the request for the information based on the relational link between the building entity and the private information.

Another implementation of the present disclosure is a database system for a building. The database system includes one or more storage devices configured to implement a building entity database including a set of entities and a set of relational links between entities of the set of entities, wherein the set of entities includes a building entity, private information, and one or more mask templates and a processing circuit. The processing circuit is configured to determine a transitive closure for the entity database based on the set of entities of the entity database and the set of relational links and update the entity database based on the transitive closure by adding additional relational links including at least one of a relational link between the building entity and the one or more mask templates or a relational link between the building entity and the private information. The processing circuit is configured to receive a request for the private information, select one of the mask templates from the entity database based on access values and the relational link between the building entity and the mask templates, retrieve the private information for the building entity based on the relational link between the building entity and the private information in response to a reception of the request for the information, and generate a masked information data structure based on the retrieved information and the selected one of the mask templates.

In some embodiments, the processing circuit is configured to receive new entity data, the new entity data including at least one of a new building entity and a new link between the new building entity and at least one of the entities of the set of entities, new private information and a new link between the new private information and at least one of the entities of the set of entities, or new mask templates and a new link between the new mask templates and at least one of the entities of the set of entities, add the new entity data to the entity database, determine the transitive closure of the entity database based on the set of entities and the new entity data added to the entity database, and update the entity database by updating the set of relational links based on the transitive closure by adding new direct relational links between the entities of the set of entities to the set of relational links.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 20 is another block diagram of the entity database of the entity service of FIG. 11 where a new object entity is added to the entity database, according to an exemplary embodiment.

FIG. 21 is another block diagram of the entity database of FIG. 20 where a transitive closure is determined by the entity service of FIG. 11 for the entity database based on the new object entity being added to the entity database, according to an exemplary embodiment.

FIG. 26 is another block diagram of the entity database of the entity service of FIG. 11 where new mask templates are added to the entity database, according to an exemplary embodiment.

FIG. 27 is another block diagram of the entity database of FIG. 26 where a transitive closure is determined by the entity service of FIG. 11 for the entity database based on the new mask templates being added to the entity database, according to an exemplary embodiment.

DETAILED DESCRIPTION

Figure 1:
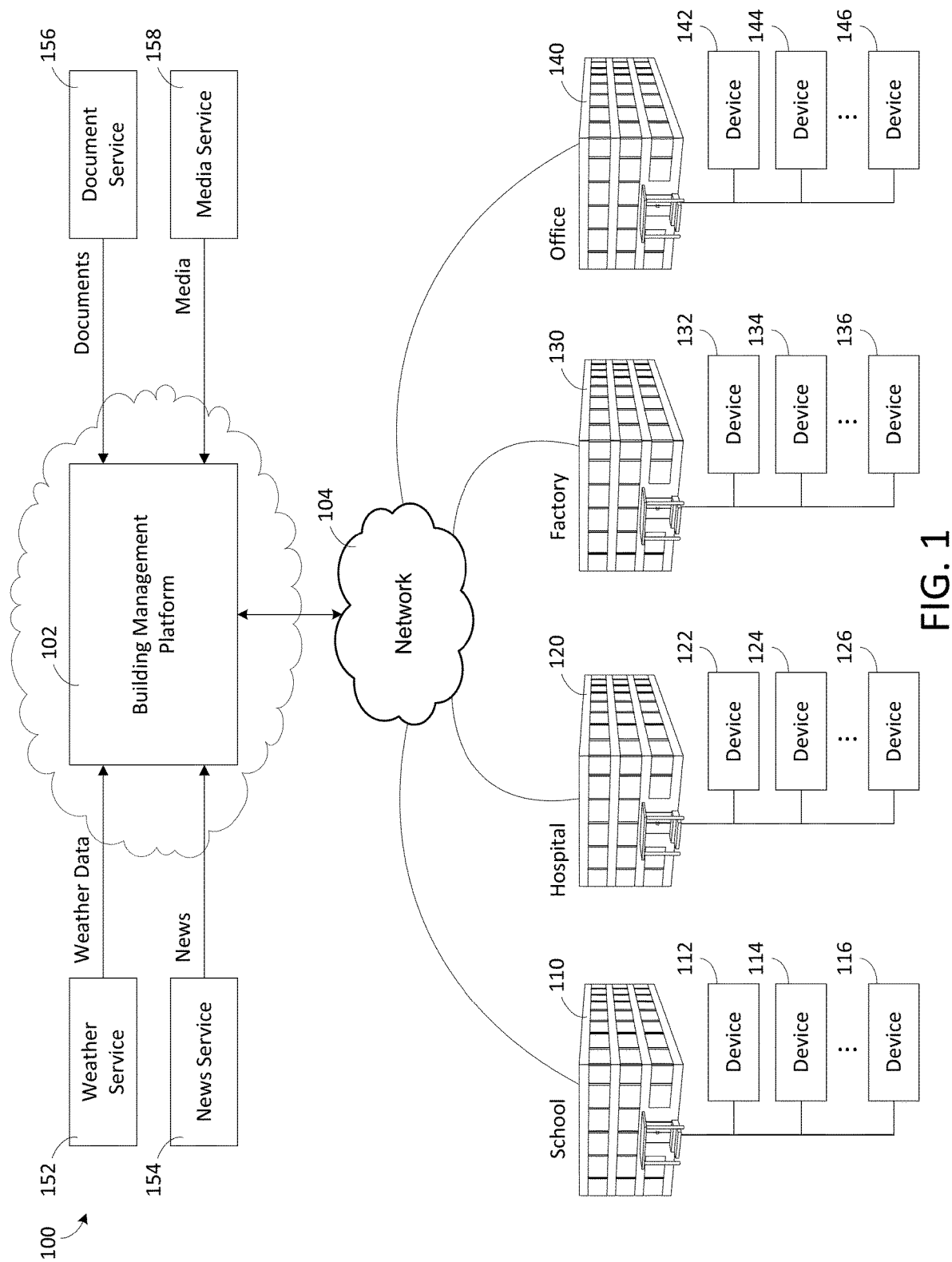
FIG. 1 is a block diagram of a smart building environment, according to an exemplary embodiment.

Referring generally to the FIGURES, a building system with smart entity personal identifying information (PII) masking is shown, according to various exemplary embodiments. A building system may store an entity database and private information (e.g., PII) for the building entities of the entity database. The entity database may be a database of various entities (e.g., entities that represent people, relationships, classes, BMS Internet of things (IoT) devices, etc.) that are linked to each other. The private information may be information related to the building entities that should be kept private and/or protected. Examples of such information may be an encryption key, a password, a social security number, a username, a data point, a telephone number, an address, an E-mail address, etc.

The building system as described herein can be configured to store one or multiple mask templates in the entity database. The building entities can each be linked to various mask templates. The mask templates can define that certain access values associated with a requesting client have access to (or do not have access to) certain pieces of private information linked to the building entities. In this regard, the mask templates can be utilized by the building system to implement attribute level protection of private information for the building entities. Specific building entities can be linked to multiple mask templates, each of the mask templates related to a same specific set of access values.

In this regard, the building system can be configured to receive a request for private information for a specific building entity from the client device. The request can include, or can be associated, with multiple access values. The access values can be a role. The role may define a certain level of access for the client device and/or a role of a user operating the client device (e.g., guest user, an administrator, super user, building technician, building tenant, building employee, supervisor, etc.). The access values can also be an application value, the application value indicating the type of application that the client device is utilizing, e.g., what software the client device is operating or logged into to perform the request. Various other access values (e.g., business use, geographic location, etc.) can be utilized by the building system and are described further elsewhere herein.

Based on the access values, the building system can select a particular mask template of the multiple mask templates linked to the building entity as a function of the access values received from and/or associated with the client device. The building system can retrieve the selected mask template and the private information associated with the building entity. Based on the selected mask template, the private information can be masked with multiple mask operators of the mask template, each masking operator being linked with one of the attributes of the private information (e.g., one of the data entries of the private information). The resulting masked private information can be provided to the client device.

Utilizing the mask templates implements an efficient solution to directly masking attribute level information for various circumstances (e.g., various combinations of access values). The mask templates can be entity specific, i.e., a specific entity may have its own set of mask templates. However, the mask templates may also be related to groups of entities (e.g., all thermostat entities may have the same set of mask templates while all user entities may have another set of mask templates). Since there may be a large amount of private information in the entity database, and a large number of different users that may be requesting the private information from different geographic locations, with different applications, and different roles, it is difficult to efficiently identify what attribute level information each user should be able to view. Some solutions may implement one or more large data structures which tabulate each attribute accessibility for each user. However, this is inefficient and requires large amounts of data storage, processing power, and design time. However, multiple reusable template masks allows for linkage between one or multiple building entities and provides a concise description of the attribute level accessibility of building entity without needing to be user specific, instead, it is access value specific.

The building system that performs PII masking with mask templates as described herein reduces storage requirements, does not require large user specific access tables, and is an easily extensible access system. For example, if a user wishes to adjust the information that can be accessed by a guest user on a specific platform for a particular entity, in this example, via a web browser, the single mask template for the entity that relates to guest user access value and web browser access value can be adjusted. This adjustment is then implemented by the building system for all access requests initiated by a client device that has a guest user role and access the system on a web browser. Adjusting the single mask template is more efficient than adjusting every entry of a user access table that indicates the access abilities of every single user.

Using the masking techniques as described herein, an extensible information management system can be implemented, one where new entities can easily be added and linked to existing mask templates without requiring substantial user interaction. For example, there may be a thermostat entity class. One thermostat of the thermostat entity class can be linked to a set of thermostat mask templates. If another thermostat is added, the mask templates do not need to be recreated and the new thermostat can be linked to the set of mask templates. In some embodiments, the link occurs automatically based on the thermostat, i.e., all thermostat entities of the thermostat class are automatically linked to the same thermostat mask templates.

Hereinafter, example embodiments will be described in more detail with reference to the accompanying drawings. FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio (AFR) meters, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, Light Detection And Ranging (LIDAR) sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, complementary metal-oxide-semiconductor (CMOS) sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational entities that define relationships between sensor object entities and the corresponding data entity. For example, each relational entity may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158 (hereinafter referred to collectively as $3^{rd}$ party services). In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
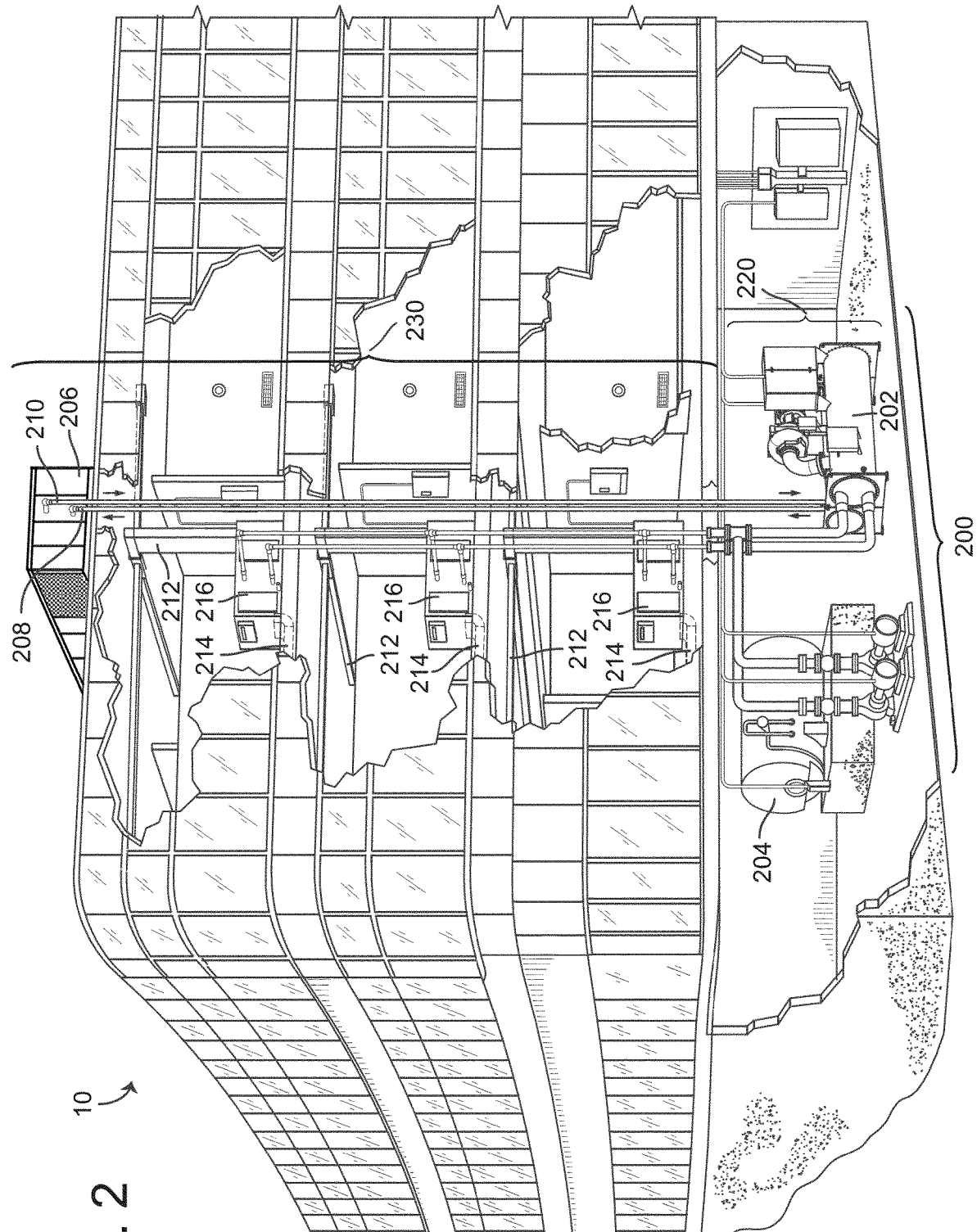
FIG. 2 is a perspective view of a smart building, according to an exemplary embodiment.
Figure 3:
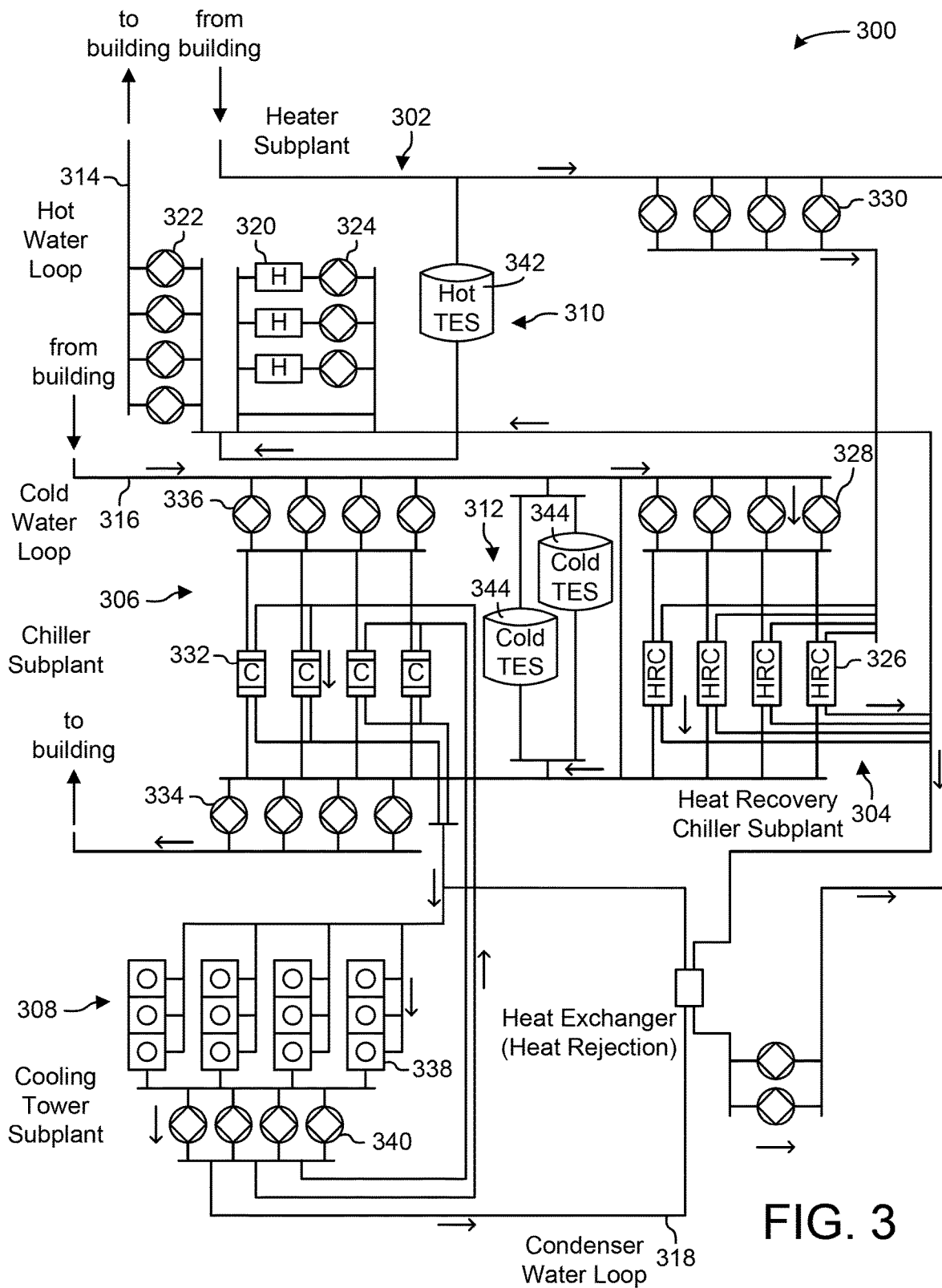
FIG. 3 is a block diagram of a waterside system, according to an exemplary embodiment.
Figure 4:
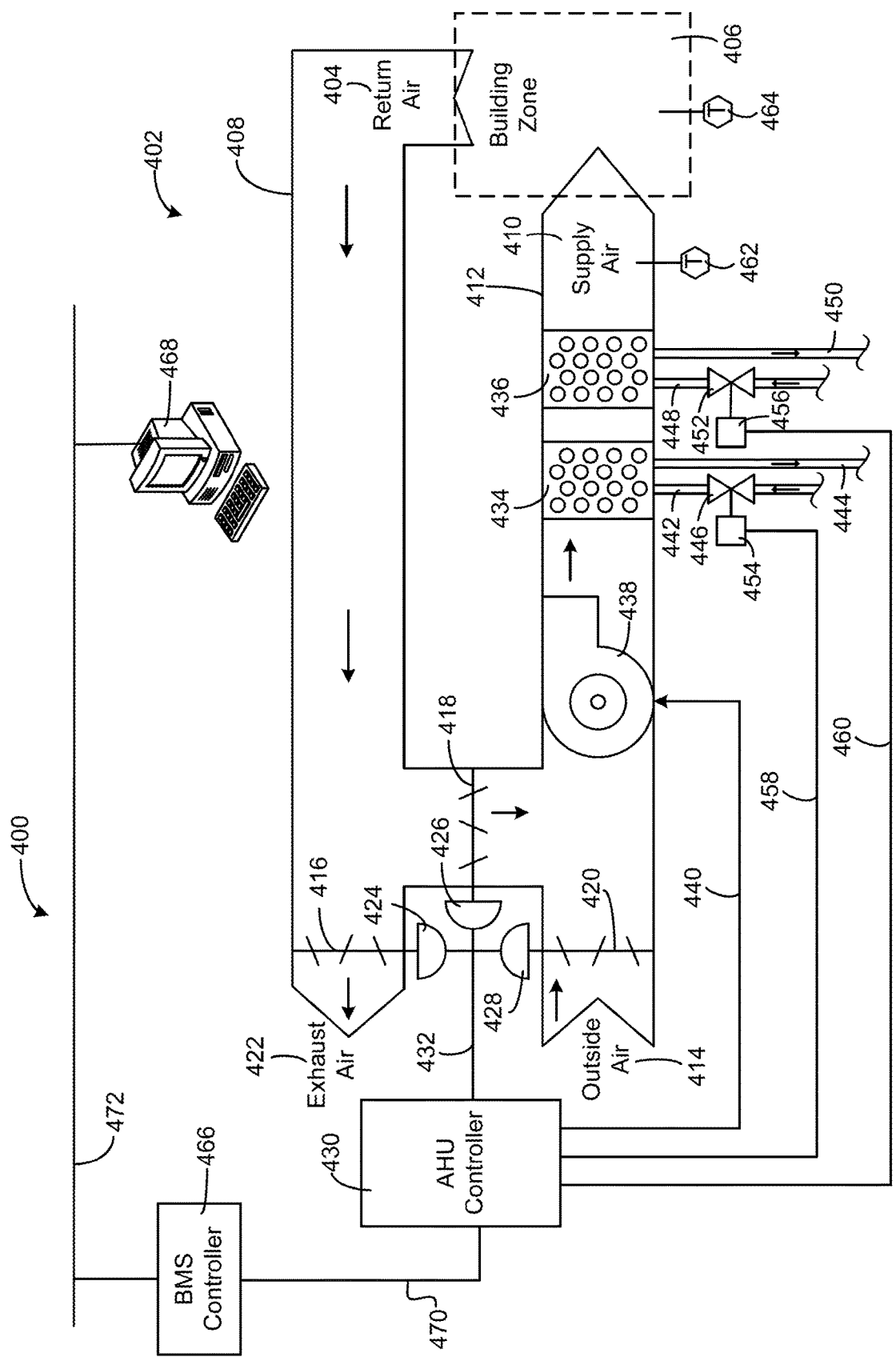
FIG. 4 is a block diagram of an airside system, according to an exemplary embodiment.
Figure 5:
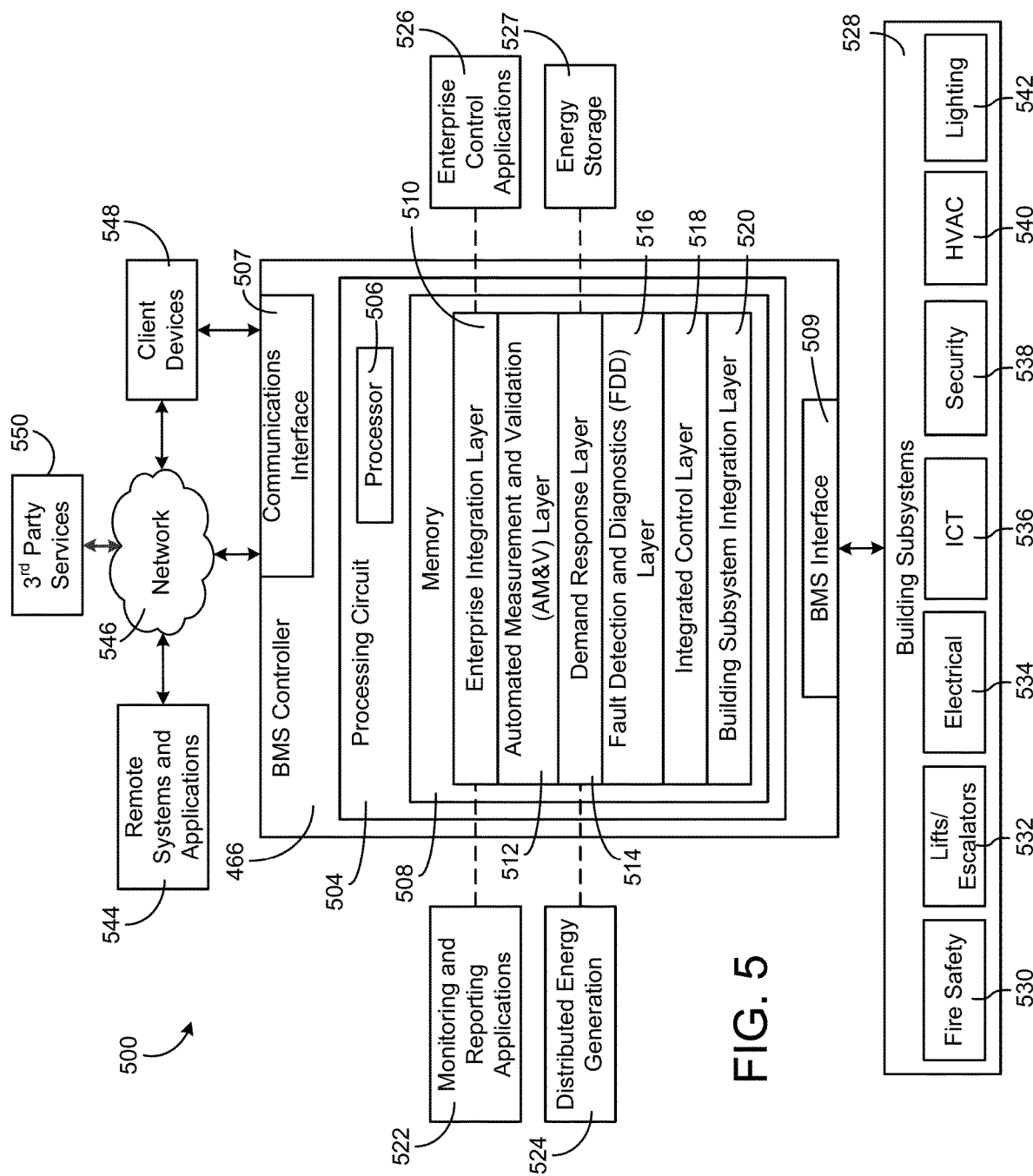
FIG. 5 is a block diagram of a building management system, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, $3^{rd}$ party services 550, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine improved and/or optimal control actions for building subsystems 528 based on the inputs, generate control signals based on the improved and/or optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to improve and/or optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine a improved and/or optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated super system. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System with Cloud Building Management Platform

Figure 6:
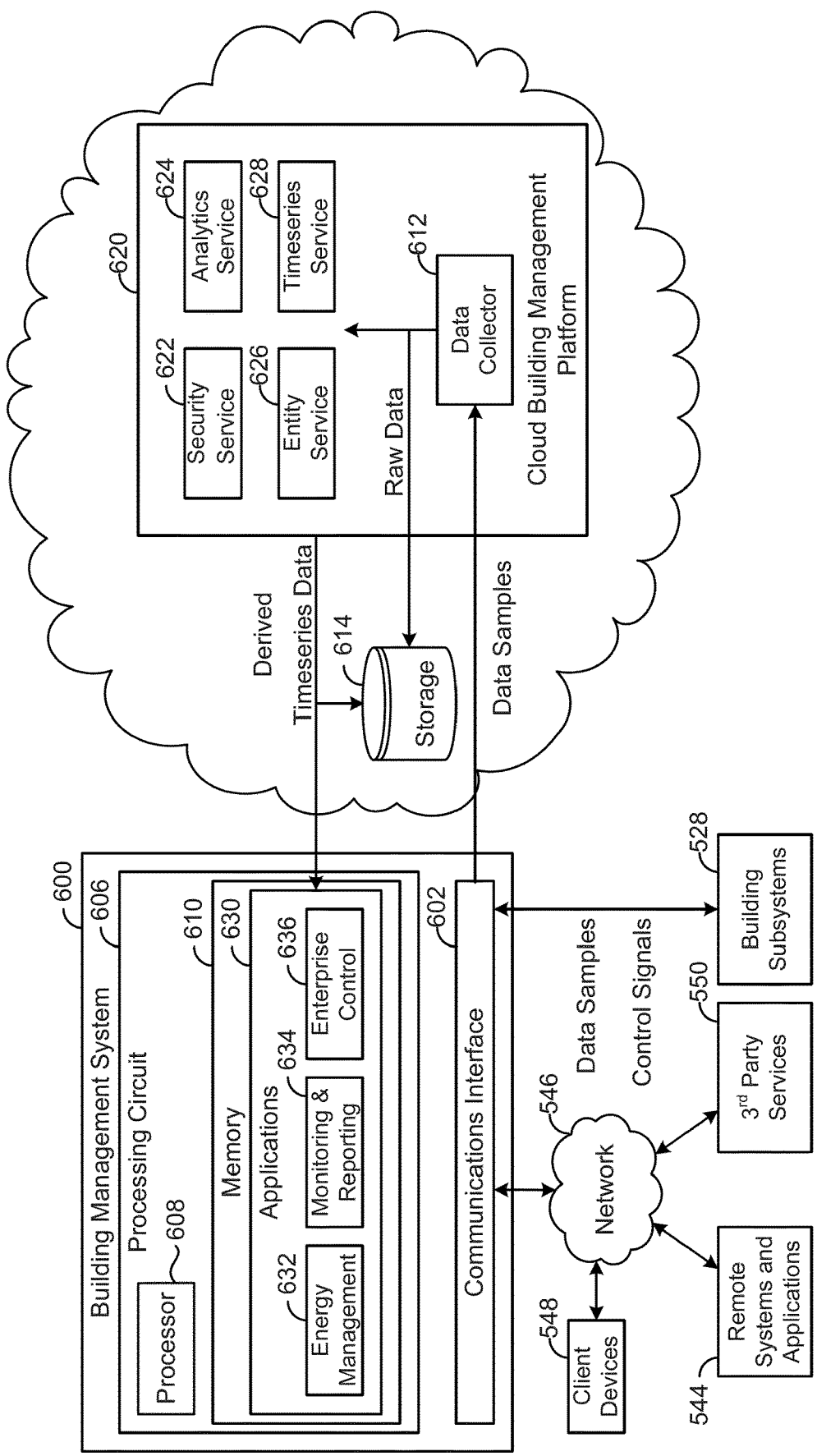
FIG. 6 is a block diagram of another building management system including a timeseries service and an entity service, according to an exemplary embodiment.

Referring now to FIG. 6, a block diagram of another building management system (BMS) 600 is shown, according to some embodiments. BMS 600 can be configured to collect data samples from client devices 548, remote systems and applications 544, 3$^{rd}$ party services 550, and/or building subsystems 528, and provide the data samples to Cloud building management platform 620 to generate raw timeseries data, derived timeseries data, and/or entity data from the data samples. In some embodiments, Cloud building management platform 620 may supplement or replace building management platform 102 shown in FIG. 1 or can be implemented separate from building management platform 102. Cloud building management platform 620 can process and transform the data samples to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 (or cloud building management platform 620) can include many of the same components as BMS 500 (e.g., processing circuit 504, processor 506, and/or memory 508), as described with reference to FIG. 5. For example, BMS 600 is shown to include a communications interface 602 (including the BMS interface 509 and the communications interface 507 from FIG. 5). Interface 602 can include wired or wireless communications interfaces (e.g., jacks, antennas, transmitters, receivers, transceivers, wire terminals, etc.) for conducting data communications with client devices 548, remote systems and applications 544, $3^{rd}$ party services 550, building subsystems 528 or other external systems or devices. Communications conducted via interface 602 can be direct (e.g., local wired or wireless communications) or via a communications network 546 (e.g., a WAN, the Internet, a cellular network, etc.).

Communications interface 602 can facilitate communications between BMS 600, Cloud building management platform services 620, building subsystems 528, client devices 548 and external applications (e.g., remote systems and applications 544 and $3^{rd}$ party services 550) for allowing user control, monitoring, and adjustment to BMS 600. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via interface 602. In some embodiments, BMS 600 receives data samples from the $3^{rd}$ party services 550, such as, for example, weather data from a weather service, news data from a news service, documents and other document-related data from a document service, media (e.g., video, images, audio, social media, etc.) from a media service, and/or the like, via interface 602 (e.g., via APIs or any suitable interface).

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform 620 may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 6, Cloud building management platform 620 is shown to include a data collector 612. Data collector 612 is shown receiving data samples from $3^{rd}$ party services 550 and building subsystems 528 via interface 602. However, the present disclosure is not limited thereto, and the data collector 612 may receive the data samples directly from the $3^{rd}$ party service 550 or the building subsystems 528 (e.g., via network 546 or via any suitable method). In some embodiments, the data samples include data values for various data points. The data values can be measured and/or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. A data sample received from a $3^{rd}$ party weather service can include both a measured data value (e.g., current temperature) and a calculated data value (e.g., forecast temperature). Data collector 612 can receive data samples from multiple different devices (e.g., IoT devices, sensors, etc.) within building subsystems 528, and from multiple different $3^{rd}$ party services (e.g., weather data from a weather service, news data from a news service, etc.) of the $3^{rd}$ party services 550.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 612 is as follows:

[<key, timestamps, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp$_i$ identifies the time at which the ith sample was collected, and value$_i$ indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to a universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 612 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 5, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, and a timeseries service 628. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 626 can assign entity information (or entity data) to the timeseries data to associate data points with a particular system, device, or space. Timeseries service 628 and analytics service 624 can apply various transformations, operations, or other functions to the raw timeseries data to generate derived timeseries data.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point ($pointID_3$) by adding two or more actual data points ($pointID_1$ and $pointID_2$) (e.g., $pointID_3=pointID_1+pointID_2$). As another example, timeseries service 628 can calculate an enthalpy data point ($pointID_4$) based on a measured temperature data point ($pointID_5$) and a measured pressure data point ($pointID_6$) (e.g., $pointID_4=enthalpy(pointID_5, pointID_6)$). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

In some embodiments, analytics service 624 analyzes the raw timeseries data and/or the derived timeseries data with the entity data to generate alerts or warnings, analyze risks, and determine threats. For example, analytics service 624 can apply probabilistic machine learning methods to model risks associated with an asset. An asset may be any resource or entity type, such as, for example, a person, building, space, system, equipment, device, sensor, and the like. Analytics service 624 can generate a risk score associated with an asset based on model parameters. The model parameters can be automatically updated based on feedback on the accuracy of the risk predictions. For example, the feedback may be explicit (e.g., based on questionnaires, disposition of alerts, and the like) or implicit (e.g., analyzing user actions on each threat or alert to estimate the importance of a particular event, and the like). The risk score may be stored as derived timeseries. For example, analytics service 624 (e.g., via timeseries service 628) can generate a risk score timeseries with data values indicating the risk score at each interval of the timeseries. The risk score timeseries can be stored as derived timeseries data along with the raw timeseries data in storage 614. The risk scores can then be retrieved, for example, by a Risk Dashboard from the timeseries service 628.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 544, client devices 548, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 528. In some embodiments, building subsystems 528 use the control signals to operate building equipment. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 528.

Cloud Building Management Platform Entity Service

Figure 7:
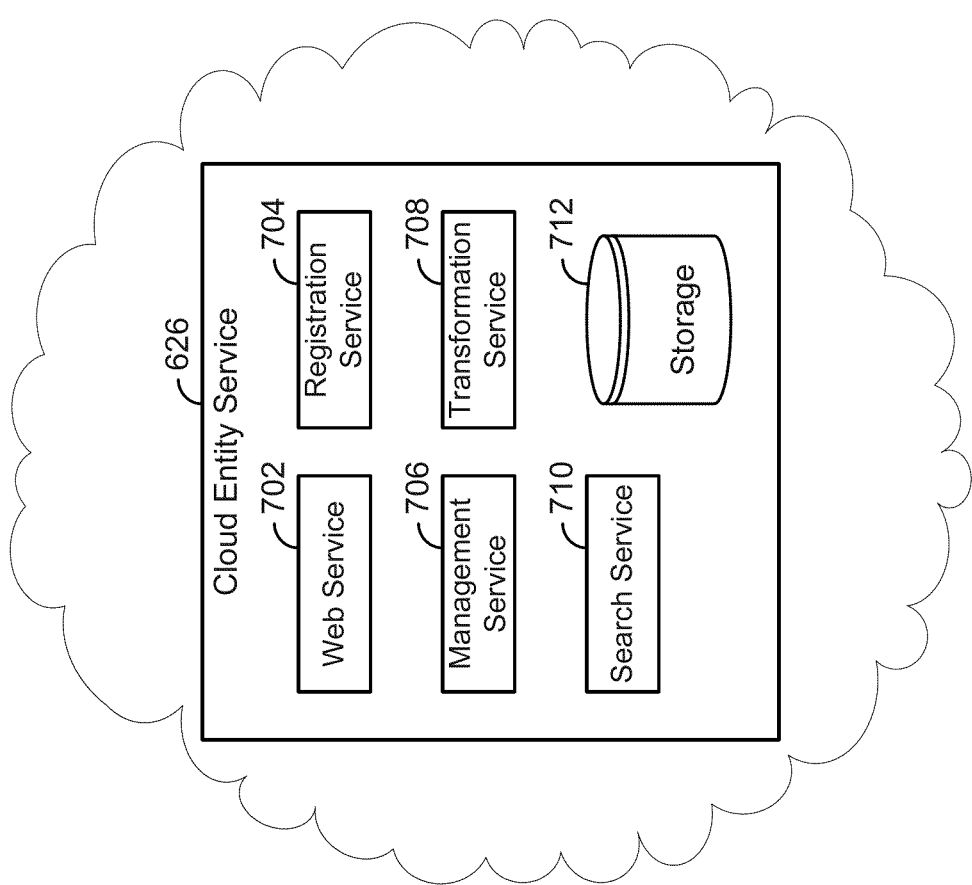
FIG. 7 is a block diagram illustrating the entity service of FIG. 6 in greater detail, according to an exemplary embodiment FIG. 8 in an example entity graph of entity data, according to an exemplary embodiment.

Referring now to FIG. 7, a block diagram illustrating entity service 626 in greater detail is shown, according to some embodiments. Entity service 626 registers and manages various buildings (e.g., 110-140), spaces, persons, subsystems (e.g., 428), devices (e.g., 112-146), and other entities in the Cloud building management platform 620. According to various embodiments, an entity may be any person, place, or physical object, hereafter referred to as an object entity. Further, an entity may be any event, data point, or record structure, hereinafter referred to as data entity. In addition, an entity may define a relationship between entities, hereinafter referred to as a relational entity.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from data sources.

In some embodiments, the relational entity may be defined as having at least a static attribute. The static attribute of the relational entity may semantically define the type of relationship between two or more entities. For example, in a non-limiting embodiment, a relational entity for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational entity specifies which entity is the part of the other (e.g., Entity A→hasPart→Entity B).

In various embodiments, the relational entity is an object-oriented construct with predefined fields that define the relationship between two or more entities, regardless of the type of entities. For example, Cloud building management platform 620 can provide a rich set of pre-built entity models with standardized relational entities that can be used to describe how any two or more entities are semantically related, as well as how data is exchanged and/or processed between the entities. Accordingly, a global change to a definition or relationship of a relational entity at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
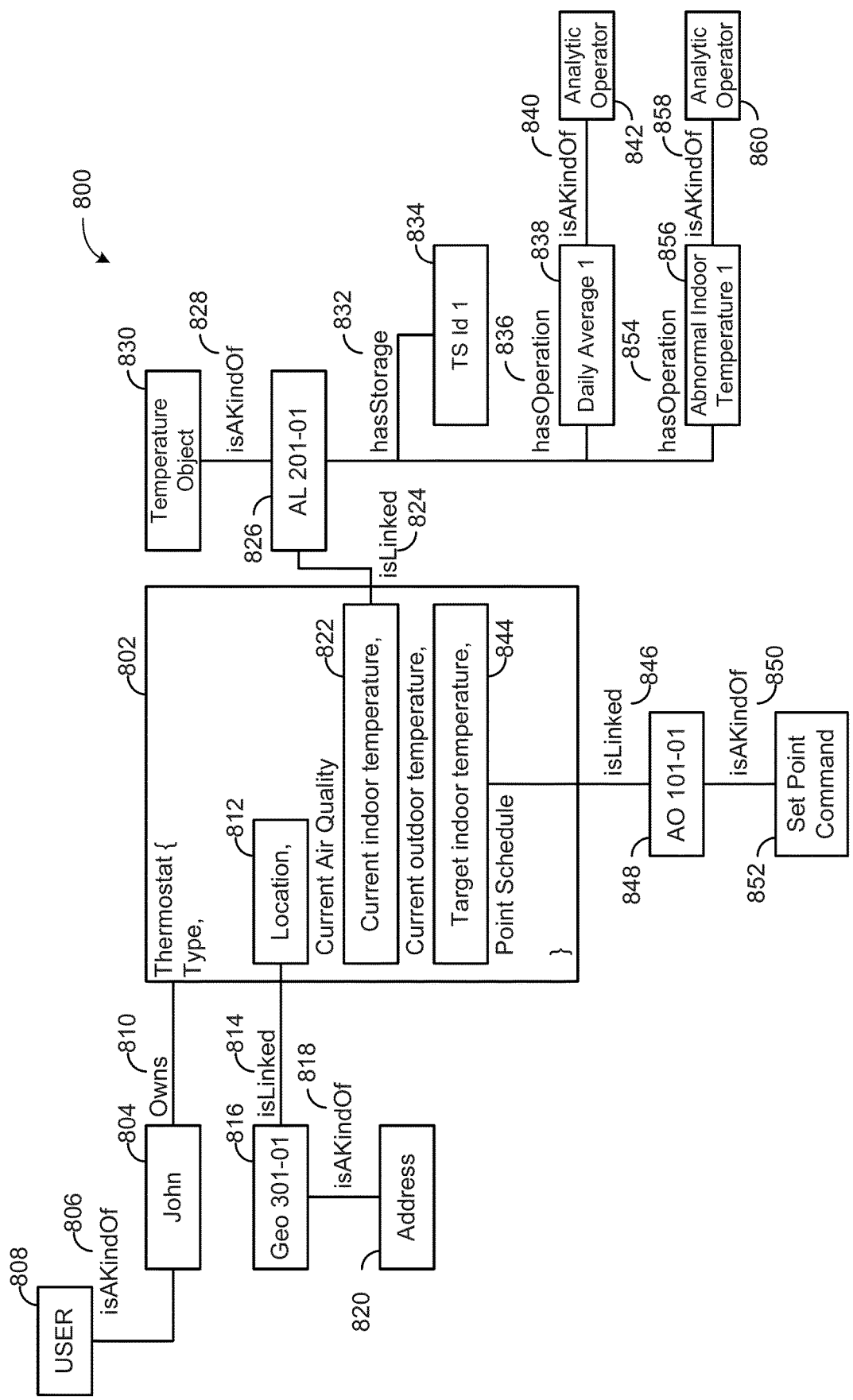

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational entities that semantically define the relationships between the entities. The relational entities may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
```

```
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational entities to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), relational entities (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational entities describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL).

For example, the entity graph 800 shows that a person named John (object entity) 804 isAKindOf (relational entity) 806 User (class entity) 808. John 804 Owns (relational entity) 810 the Thermostat 802. The Thermostat 802 has a location attribute (dynamic attribute) 812 that isLinked (relational entity) 814 to Geo 301-01 (data entity) 816, which isAKindOf (relational entity) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational entity) 824 to AI 201-01 (data entity) 826. AI 201-01 826 isAKindOf (relational entity) 828 Temperature Object (class entity) 830. Thus, AI 201-01 826 should contain some sort of temperature related data. AI 201-01 826 hasStorage (relational entity) 832 at TS ID 1 (data entity) 834, which may be raw or derived timeseries data for the temperature readings. AI 201-01 826 hasOperation (relational entity) 836 of Daily Average 1 (data entity) 838, which isAKindOf (relational entity) 840 Analytic Operator (class entity) 842. Thus, Daily Average 1 results from an analytic operation that calculates the daily average of the indoor temperature. AI 201-01 826 further hasOperation (relational entity) 854 of Abnormal Indoor Temperature (data entity) 856, which isAKindOf (relational entity) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
    point: "AI 201-01";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational entity hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850 SetPoint Command (class entity) 852. Thus, the data in data entity AO 101-01 848 may be set via a command by the user or other entity, and may be used to control the Thermostat object entity 802. Accordingly, in various embodiments, entity graph 800 provides a user friendly view of the various relationships between the entities and data processing flow, which provides for ease of navigation, browsing, and analysis of data.

Referring again to FIG. 7, entity service 626 may transform raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, relational entity, and/or the like). In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., IoT device) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 528 and client devices 548 (e.g., via web service 702) to register each entity (e.g., building, BMS, building subsystems, devices, and the like) with Cloud building management platform 620. In some embodiments, registration service 704 registers a particular building subsystem 528 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 528 may store the device key and/or device ID according to the protocols of the TPM. If the device does not include a TPM, the device or building subsystem 528 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 528 or device and/or a particular user profile (e.g., a particular user). In this regard, a device (or building subsystem 528) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational entities defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational entity (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational entities of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational entities of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational entity. In this case, Management service 706 may automatically update the attribute data in the linked data entity. Further, if a linked data entity does not exist, Management service 706 can create a data entity (e.g., AI 201-01) and an instance of the isLinked relational entity 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational entities in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object each time a person enters or exits the building using a related card entity, such that the "number of occupants" attribute (or data entity) reflects the current number of occupants within the building object. As another example, a "total revenue" attribute associated with a product line object may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational entities. In some embodiments, if a data entity corresponding to the virtual data point does not exist, management service 706 may automatically create a corresponding data entity and one or more relational entities that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational entities of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can associate weather data from a weather service in the region in which the building object entity is located with the building object entity, and analytics service 624 can generate a risk score for the possibility that any severe weather is approaching the person's location based on the associated weather data, building entity, and person entity. Similarly, management service 706 can associate building data from related building entities with the building object entity, and analytics service 624 can determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can provide these and other types of data to analytics service 624 as inputs to a risk function that calculates the value of the person object's "risk" attribute and can update the person object (or related device entity of the person object) accordingly.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogeneous data of different entities in the same class may be avoided. Accordingly, interoperability and scalability of applications may be improved.

In some embodiments, transformation service 708 can provide entity matching, cleansing, and correlation so that a unified cleansed view of the entity data including the entity related information (e.g., relational entities) can be provided. Transformation service 708 can support semantic and syntactic relationship description in the form of standardized relational entities between the various entities. This may simplify machine learning because the relational entities themselves provide all the relationship description between the other entities. Accordingly, the rich set of pre-built entity models and standardized relational entities may provide for rapid application development and data analytics.

Still referring to FIG. 7, the search service 710 provides a unified view of product related information in the form of the entity graph, which correlates entity relationships (via relational entities) among multiple data sources (e.g., CRM, ERP, MRP and the like). In some embodiments, the search service 710 is based on a schema-less and graph based indexing architecture. The search service 710 facilitates simple queries without having to search multiple levels of the hierarchical tree of the entity graph. For example, search service 710 can return results based on searching of entity type, individual entities, attributes, or even relational entities without requiring other levels or entities of the hierarchy to be searched.

Timeseries Data Platform Service

Figure 9:
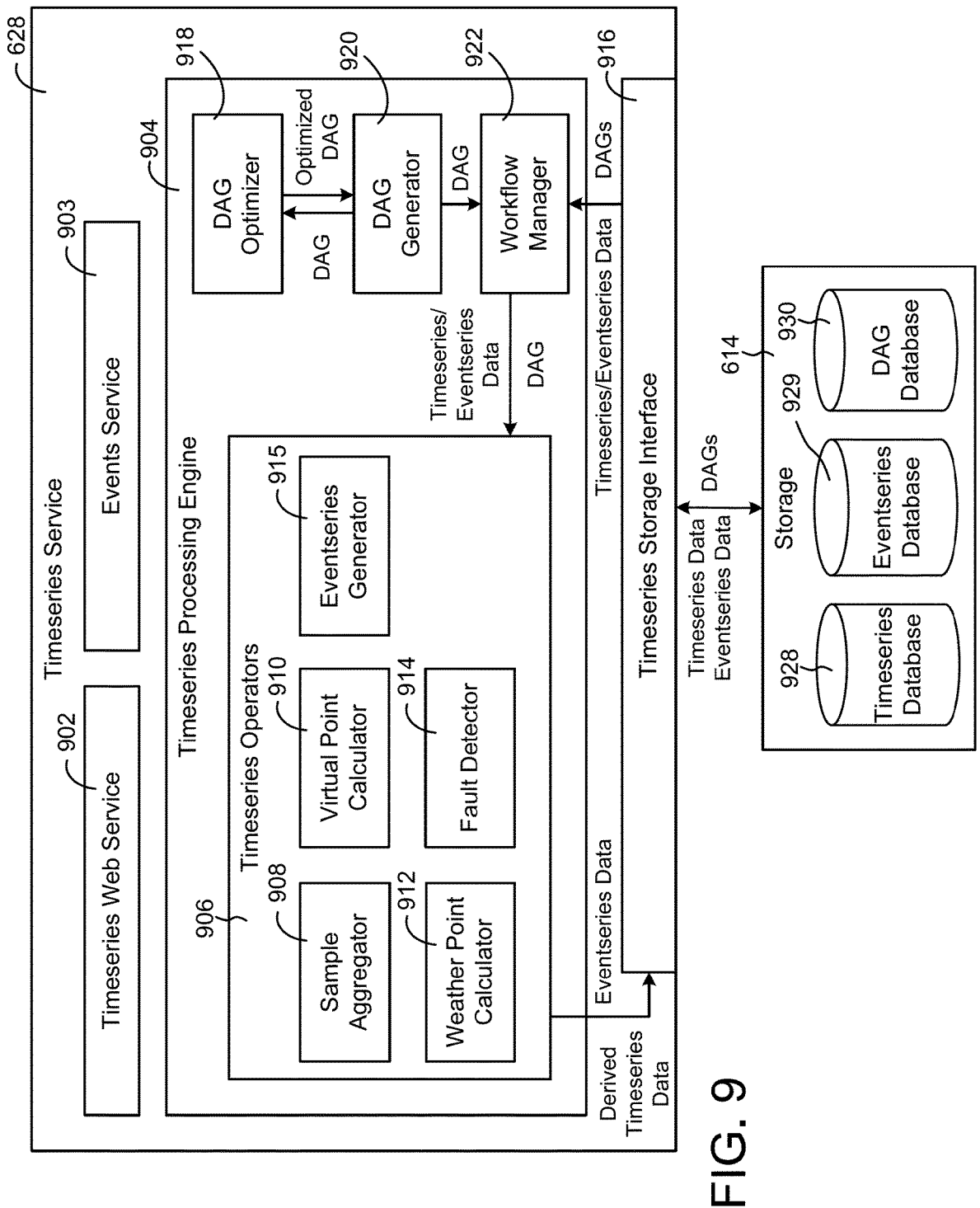
FIG. 9 is a block diagram illustrating the timeseries service of FIG. 6 in greater detail, according to an exemplary embodiment.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, device ID, etc.), timestamp$_i$ identifies a time associated with the ith sample, and value$_i$ indicates the value of the ith sample.

In some embodiments, timeseries storage interface 916 stores eventseries as lists of events having a start time, an end time, and a state. For example, timeseries storage interface 916 can store eventseries in the following format:

[< eventID$_1$, start_timestamp$_1$, end_timestamp$_1$, state$_1$ >, ..., < eventID$_N$, start_timestamp$_N$, end_timestamp$_N$, state$_N$ >]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational entities defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational entities can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the pre-processed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 10:
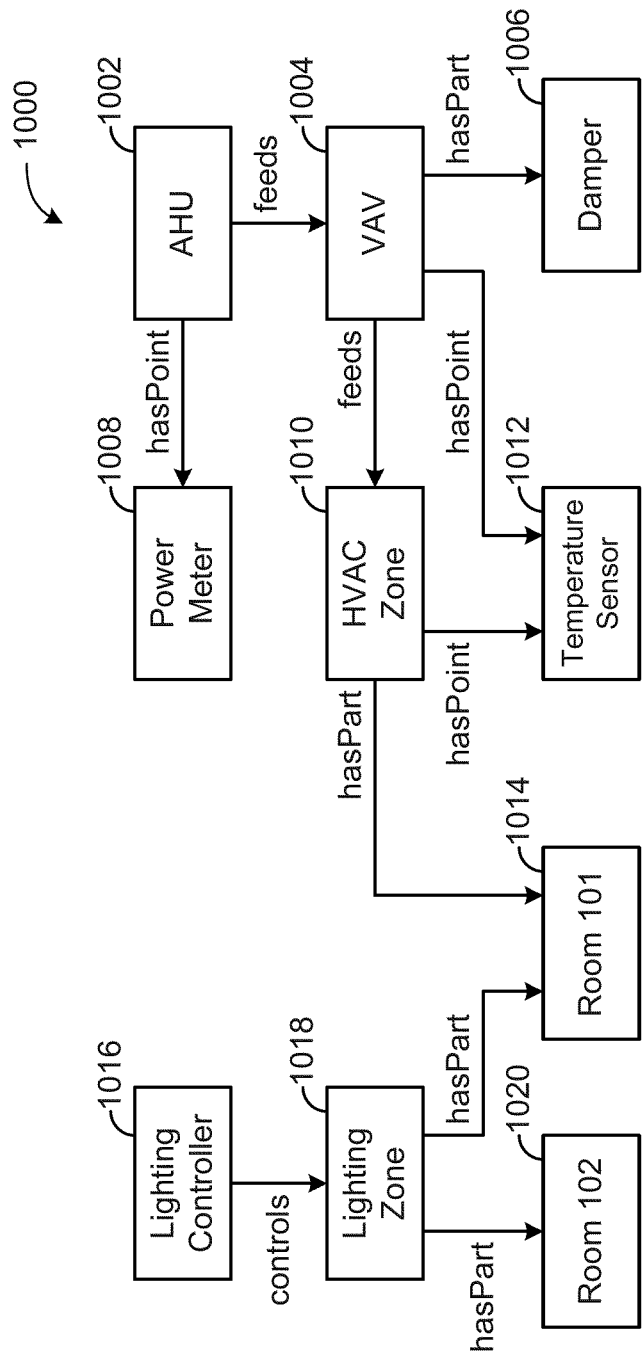
FIG. 10 is an example entity graph of entity data, according to an exemplary embodiment.

FIG. 10 is an example entity graph of entity data according to an embodiment of the present disclosure. The example of FIG. 10 assumes that an HVAC fault detection application has detected an abnormal temperature measurement with respect to Temperature Sensor 1012. However, Temperature Sensor 1012 itself may be operating properly, but may rely on various factors, conditions, and other systems and devices to measure the temperature properly. Accordingly, for example, the HVAC fault detection application may need to know the room 1014 in which the Temperature Sensor 1012 is located, the corresponding temperature setpoint, the status of the VAV 1004 that supplies conditioned air to the room 1014, the status of the AHU 1002 that feeds the VAV 1004, the status of the vents in the HVAC zone 1010, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 10, entity graph 1000 shows the relationship between Temperature Sensor 1012 and related entities via relational entities (e.g., feeds, hasPoint, hasPart, Controls, etc.). For example, entity graph 1000 shows that Temperature Sensor 1012 provides temperature readings (e.g., hasPoint) to the VAV 1004 and the HVAC Zone 1010. An AHU 1002 provides (e.g., feeds) the VAV 1004 with chilled and/or heated air. The AHU 1002 receives/provides power readings (e.g., hasPoint) from/to a Power Meter 1008. The VAV 1004 provides (e.g., feeds) air to HVAC Zone 1010 using (e.g., hasPart) a Damper 1006. The HVAC Zone 1010 provides the air to Room 1014. Further, Rooms 1014 and 1020 are located in (e.g., hasPart) Lighting Zone 1018, which is controlled (e.g., controls) by Lighting Controller 1016.

Accordingly, in the example of FIG. 10, in response to receiving the faulty measurement from Temperature Sensor 1012, the HVAC fault detection application and/or analytics service 624 can determine from the entity graph that the fault could be caused by some malfunction in one or more of the other related entities, and not necessarily a malfunction of the Temperature Sensor 1012. Thus, the HVAC fault detection application and/or the analytics service 624 can further investigate into the other related entities to determine or infer the most likely cause of the fault.

Building Information Management System

Figure 11:
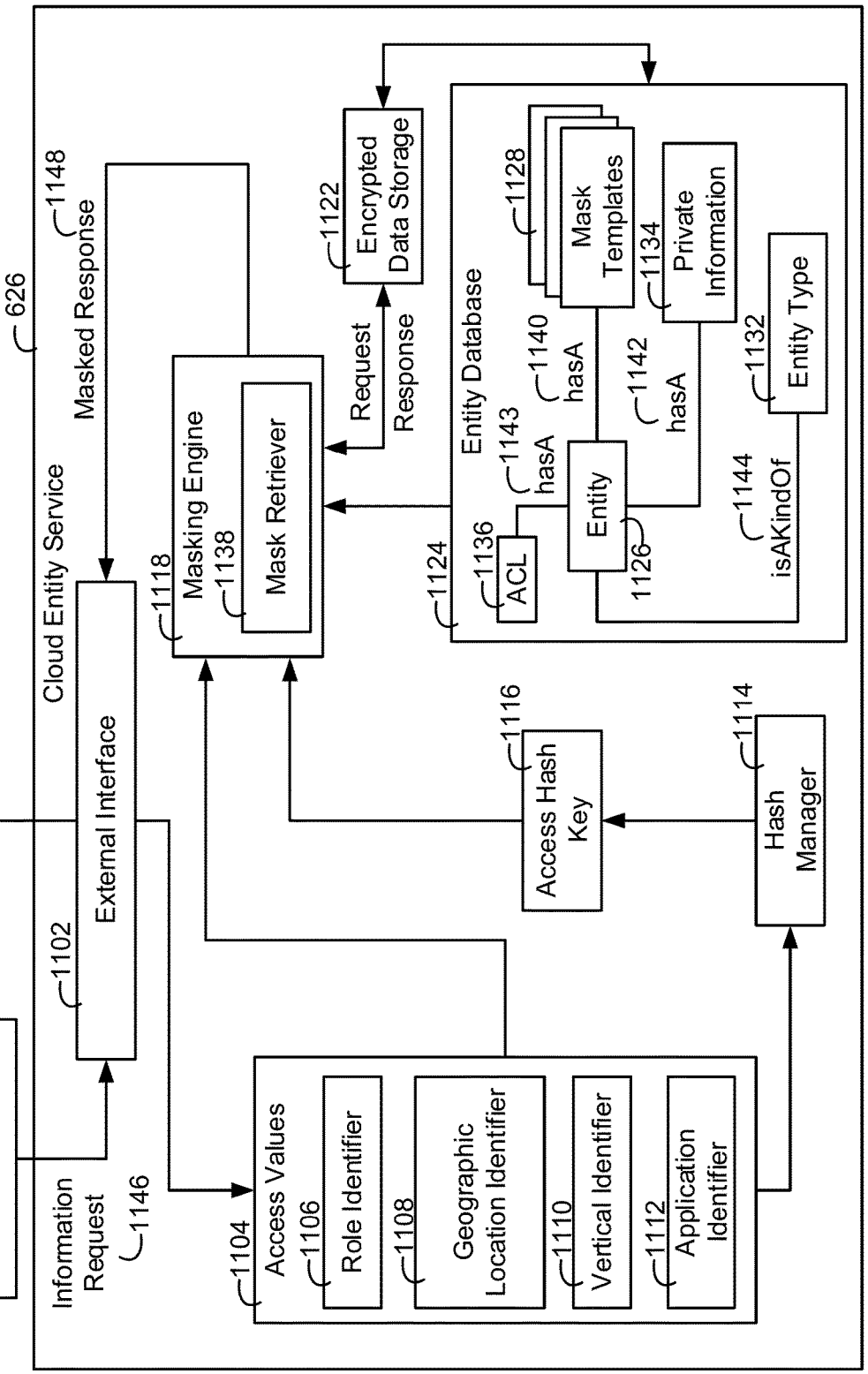
FIG. 11 is a block diagram of the entity service of FIG. 7 performing private information management with mask templates, according to an exemplary embodiment.

Referring now to FIG. 11, the cloud entity service 626 of FIG. 6 is shown in greater detail implementing information management with mask templates, according to an exemplary embodiment. While FIG. 11, and generally FIGS. 11-18, describe the information management being performed by the cloud entity service 626, any computing device as described herein can be configured to perform the information management as described with reference to FIGS. 11-18. For example, the security service 622 as described with reference to FIG. 6, can be configured to perform some and/or all of the operations of the cloud entity service 626 as described with reference to FIGS. 11-18. The cloud entity service 626 is in communication with the client devices 548 as described with reference to FIG. 5. The client devices 548 can be in communication with the cloud entity service 626 via the network 546 as described with further reference to FIG. 6.

The client devices 548 can be in communication with the cloud entity service 626 via an interface application 1100. The interface application 1100 is configured to operate on the client devices 548 or otherwise on other devices (e.g., a web server, the building management system 600, the cloud building management platform 620, etc.) in some embodiments. In some embodiments, the interface application 1100 is one or multiple of the applications 630 (e.g., the energy management application 632, the monitoring & reporting application 634, and/or the enterprise control application 636). In some embodiments, the interface application 1100 is a risk management application for reviewing risk (e.g., risk for a specific threat event, e.g., a fire, storm, etc.). Risk applications are described with further reference in U.S. Provisional Application No. 62/628,647, filed Feb. 9, 2018, U.S. Provisional Application No. 62/628,711 filed Feb. 9, 2018, and U.S. Provisional Application No. 62/637,954 filed Mar. 2, 2018, the entirety of each of these applications is incorporated by reference herein in their entireties.

The cloud entity service 626 includes an external interface 1102 in some embodiments. The external interface 1102 can be a software and/or hardware component configured to interface cloud entity service 626 with the client devices 548. For example, the external interface 1102 can be, or can include, the communications interface 602 as described with reference to FIG. 6. In some embodiments, the external interface 1102 is and/or includes an application programming interface (API). In some embodiments, the external interface 1102 is configured to manage information request 1146 received from client devices 548 and provide a masked response 1148 to the client devices 548 in response to receiving the information request 1146.

The information request 1146 can be a request for private information for a particular entity of entity database 1124. The information request 1146 can be generated by the client devices 548 and/or the interface application 1100. In some embodiments, rather than a client device generating the information request 1146, another system and/or computing device can generate the information request 1146 and/or provide the information request 1146 to the external interface 1102. For example, the information request 1146 can be generated by another component of cloud building management platform 620, by the building management system 600, by building subsystems 528, by $3^{rd}$ party services 550, by BMS controller 466, and/or any other computing device as described herein.

The information request 1146 can identify a particular building entity (e.g., entity 1126) and/or be a request for specific private information (or generally all private information) for the particular building entity. The information request 1146 can include, or can be related to, access values 1104. The access values can be provided by the client devices 548 and/or the interface application 1100 to external interface 1102. In some embodiments, a username and/or password (or other identifying information) is provided by the client devices 548 and/or the interface application 1100 to the external interface 1102. Based on the identifying information, the external interface 1102 can be configured to retrieve the access values 1104 associated with the identifying information. In this regard, the external interface 1102 may store a list of login credentials and linked access values 1104 for each of the login credentials.

The access values 1104 can be one or more values that masking engine 1118 can be configured to utilize to select one mask template of the mask templates 1128. The access values 1104 can be and/or can include a role identifier 1106, a geographic location identifier 1108, a vertical identifier 1110, and/or an application identifier 1112. The role identifier 1106 can be a value indicative of a particular role of a user of the client devices 548. For example, if the user is a building occupant, the role identifier 1106 may be a "Building Occupant" role. If the user is a building owner, the role may be a "Building Owner" role. Other role identifiers 1106 may be a tenant role, a super user role, a technician role, and/or any other role. The role may be indicative of the level of access, or specific tailored amounts of access, that the user should be allowed to have.

The geographic location identifier 1108 may be indicative of a location of the client devices 548. For example, in some embodiments, the geographic location identifier 1108 may be indicative of a particular geographic location (e.g., a state, a country, a coordinate, etc.). The geographic location identifier 1108 can be based on an Internet Protocol (IP) address associated with the client devices 548, can be a reported coordinate generated by a global positioning system (GPS) of the client devices 548, can be programmed into the external interface 1102 for a specific device, etc.

The vertical identifier 1110 may identify a particular business use of the client devices 548 and/or a particular business associated with the user of the client devices 548. For example, if the user is a health care professional (e.g., a doctor, a nurse, a surgeon, etc.) and/or the client devices 548 or an account associate with the client devices 548 is associated with a hospital, a hospice, or a rehabilitation center, the vertical identifier 1110 may be a "Health Care" vertical. Similarly, if the user of the client devices 548 is a building tenant or a landlord and/or the client devices 548 are used to access an interface associated with an apartment or rented property, the vertical identifier 1110 may be an "Apartment" vertical.

The application identifier 1112 can identify the specific type of interface application 1100 that the client devices 548 utilize to communicate with the cloud entity service 626. For example, if the interface application 1100 is a web browser, the application identifier 1112 may be "Web Browser." If the interface application 1100 is a resident portal (or the interface application 1100 connects to a resident portal), the application identifier 1112 may be "Resident Portal." Furthermore, the interface application 1100 may be a security monitoring application for a security system, the application identifier 1112 may be "Security Monitoring Application."

The access values 1104 are provided to the masking engine 1118 for generating the masked response 1148 in some embodiments. Furthermore, an access hash key 1116 is provided to the masking engine 1118 in some embodiments. The access hash key 1116 can be generated by hash manager 1114 and provided by the hash manager 1114 to the masking engine 1118. The hash manager 1114 can be configured to generate the access hash key 1116 based on some and/or all of the access values 1104. For example, the hash manager 1114 can be configured to concatenate some and/or all of the access values 1104 together and hash the concatenated access values. Examples of hashing algorithms that the hash manager 1114 can be configured to perform to generate the access hash key 1116 based on the access values 1104 can be SHA-224, SHA-256, Pearson hashing, Buzhash, HMAC, MD6, MD5, and/or any other type of cryptographic or non-cryptographic hashing algorithm.

The masking engine 1118 can be configured to receive the access values 1104 from the external interface 1102 and/or receive the access hash key 1116 from the hash manager 1114. Based on the access values 1104 and/or the access hash key 1116, the masking engine 1118 can be configured to retrieve private information for the information request 1146, retrieve one of the mask templates 1128, and generate the masked response 1148 based on the retrieved mask template and the retrieved private information. The masking engine 1118 can be configured to implement one or multiple masking operators of the mask templates 1128 to mask the private information. In some embodiments, each of the masking operators of the mask templates 1128 corresponds to a specific private data attribute. In this regard, the masking engine 1118 can apply each of the masking operators to a specific private data attribute to generate the masked response 1148.

In some embodiments, the masking engine 1118 is implemented within the cloud entity service 626. However, in some embodiments, the masking engine 1118 is implemented in various devices (e.g., e.g., in a building device, in a particular domain, in a particular application, in a database, etc.) such that the masking engine 1118 can send a request to the cloud entity service 626 for a particular mask, retrieve the mask, and then mask local and/or information of the cloud entity service 626 with the mask.

The masking engine 1118 includes a mask retriever 1138 in some embodiments. The mask retriever 1138 can be configured to retrieve a mask template of the mask templates 1128 based on the access values 1104 and/or the access hash key 1116. The mask retriever 1138 can be configured to store a mask retrieval structure which associates each combination of access values 1104 (or value for access hash key 1116) with a particular mask template of the mask templates 1128. The mask retrieval structure is described with greater detail in FIG. 12. In some embodiments, instead of, and/or in addition to, a mask retrieval data structure, the mask retriever 1138 can be configured to search the mask templates 1128 based on the access hash key 1116 and/or the access values 1104 to identify a mask template of the mask templates 1128 that corresponds to the access hash key 1116 and/or the access values 1104 (e.g., each of the mask templates 1128 may store specific values for the access values 1104 and/or the access hash key 1116 and the masking engine 1118 can determine whether some and/or all of particular access values 1104 match specific access and/or hash key values of one of the mask templates 1128).

The cloud entity service 626 is includes the entity database 1124. The entity database 1124 may store one or multiple data structures of interrelated entities. The entity database 1124 may be the same as and/or similar to the entity graph 800 as described with reference to FIG. 8, the storage 712 as described with reference to FIG. 7, and/or the entity graph 1000 as described with reference to FIG. 10. The entity database 1124 can store data structures (e.g., class entities, relational entities, object entities, and/or data entities) as described with reference to FIGS. 8 and 10 and elsewhere herein. Class entities can be user entities, address entities, a setpoint command, a temperature object, a building entity, etc. while an object entity may be a particular instance of the class entity. A relational entity can be a relation between two object entities, an object entity and a data entity, an object entity and a class entity and may be isAKindOf, Owns, isLinked, hasStorage, hasOperation, hasA, isRelatedTo, and/or any other kind of semantic relationship. The data entities can be attributes e.g., analog inputs, virtual data points, private information, etc.

The entity database 1124 includes an entity 1126. The entity 1126 may be an object entity (e.g., a user, a building, a device, etc.). The entity 1126 isAKindOf 1144 (relational entity) entity type 1132 (class entity). For example, entity 1126 could be a particular thermostat object entity and can be based on a thermostat entity class via a relational entity (i.e., isAKindOf 1144). Furthermore, the entity 1126 could be a particular person object entity, John Smith, and can be based on a user class entity.

The entity 1126 hasA 1143 (relational entity) access control list (ACL) 1136 (data entity). The ACL 1136 can store one or multiple identifiers identifying a particular principle (e.g., role, application, username) that has access to the entity 1126. For example, the ACL may indicate that only certain roles have access to the private information 1134 of entity 1126. For example, only Super User roles have access to the private information 1134 of the entity 1126. In this regard, the mask retriever 1138 may first determine whether the role identifier 1106 is a role indicated by the ACL 1136 for the entity 1126. In response to a determination that the role identifier 1106 has access to the entity 1126, the mask retriever 1138 can retrieve the appropriate mask template of mask templates 1128 and mask the private information 1134 with the retrieved mask template of the mask templates 1128.

Entity 1126 hasA 1142 (relational entity) private information 1134. The private information 1134 may be, or may be indicative of, private information of the entity 1126. In some embodiments, the entity database 1124 stores the private information 1134 directly. In some embodiments, the entity database 1124 stores a relational link between the private information 1134 and encrypted private information stored in encrypted data storage 1122. For example, the private information 1134 may be a link to actual encrypted data stored in encrypted data storage 1122. In this regard, in retrieving the private information 1134 from entity database 1124, masking engine 1118 can be configured to retrieve and/or decrypt actual private information stored in the encrypted data storage 1122 based on the private information 1134 which is a link (e.g., handle) to the actual encrypted data in the encrypted data storage 1122.

The private information 1134 may be an encryption key, a password, a social security number, a username, a password, login credentials, a data point, a telephone number, an address, marital status, age, height, work address, work telephone number, email address, date of birth, birthplace, country of residence, gender, race, passport number, credit card number, banking information, criminal record, job position title, grade information, salary, tax bracket, work permit information, visa status, citizenship, genetic information, genetic code, eye color, retinal data, image of handwritten signature, facial image data, finger print data, medical history, medical prescriptions, vehicle registration number, driver license number, license plate number, network address (e.g., IP address, MAC address, BACnet address), device name, device owner, device identifier, device configuration data, temperature setpoint, pressure setpoint, humidity setpoint, temperature data, timeseries data, occupancy data, air quality data, and/or any other kind of private data.

The entity 1126 hasA 1140 (relational entity) mask templates 1128. The relational entity hasA 1140 can establish a link between the entity 1126 and the mask templates 1128 specific for the entity 1126. In this regard, in response to the information request 1146, the masking engine 1118 can determine which mask templates are appropriate for masking the private information 1134 by identifying the relationships of entity 1126. The masking engine 1118 can identify that mask templates 1128 are the appropriate set of mask templates (the entity database 1124 may store multiple sets of mask templates, each linked to various entities) and can select one of the mask templates 1128 for masking the private information 1134.

The cloud entity service 626 includes the encrypted data storage 1122 in some embodiments. In some embodiments, the encrypted data storage 1122 stores some and/or all of the entity database 1124 in encrypted form. For example, all of the class entities, object entities, relational entities, and data entities can be encrypted by the cloud entity service 626 and stored in the encrypted data storage 1122. The cloud entity service 626 can be configured to generate the entity database 1124 by decrypting the encrypted class entities, object entities, relational entities, and/or data entities. In some embodiments, only some of the class entities, object entities, relational entities, and/or data entities are stored in the encrypted data storage 1122. For example, the private information 1134 may be encrypted and stored in the encrypted data storage 1122. The masking engine 1118 can be configured to retrieve and/or decrypt the encrypted private information stored in the encrypted data storage 1122.

In some embodiments, the masking engine 1118 can be configured to determine whether the information of the information request 1146 is a request for public information or a request for private information. The masking engine 1118 can be configured to determine, based on the information request 1146, whether the masking engine 1118 needs to be implemented or not. If the information request 1146 is a request for the private information 1134 (e.g., information marked as private information by the entity database 1124), the masking engine 1118 can be configured to apply one of the mask templates 1128 on the private information 1134 and provide the masked response 1148 to the client devices 548. If the information request 1146 is a request for information linked to the entity 1126 that is marked as public information, the masking engine 1118 can be configured to provide the public information to the client devices 548 without masking the public information.

For example, the entity 1126 can be linked to various data entities. Each of the data entities may indicate whether the data is private or public. For example, the private information 1134 may be private while another data entity, a public data entity, can be linked (via a hasA relational entity) to the entity 1126). The public data entity can include an indication that the data entity is public. In this regard, the masking engine 1118 can determine, based on the entity database 1124, specifically, based on the data entities, whether the data is public or private.

In some embodiments, the information request 1146 identifies a particular entity of the entity database 1124 (e.g., the entity 1126) and includes a request for private information (or specific information) related to the entity 1126. In this regard, the masking engine 1118 can determine to retrieve the private information 1134 since the private information 1134 is linked to the entity 1126 via hasA 1142. Furthermore, the masking engine 1118 can determine to retrieve one off the mask templates 1128 since the mask templates 1128 are linked to the entity 1126 via hasA 1140.

Similarly, in some embodiments, the information request 1146 may include a request for specific information, e.g., a direct request for the private information 1134. In this regard, the masking engine 1118 can determine to retrieve the private information 1134 since the information request 1146 indicates the private information 1134. Furthermore, the masking engine 1118 can determine to retrieve one of the mask templates 1128 since the masking engine 1118 can determine that the mask templates 1128 are linked to the private information 1134, i.e., the entity 1126 is linked to the mask templates 1128 and the private information 1134.

Figure 12:
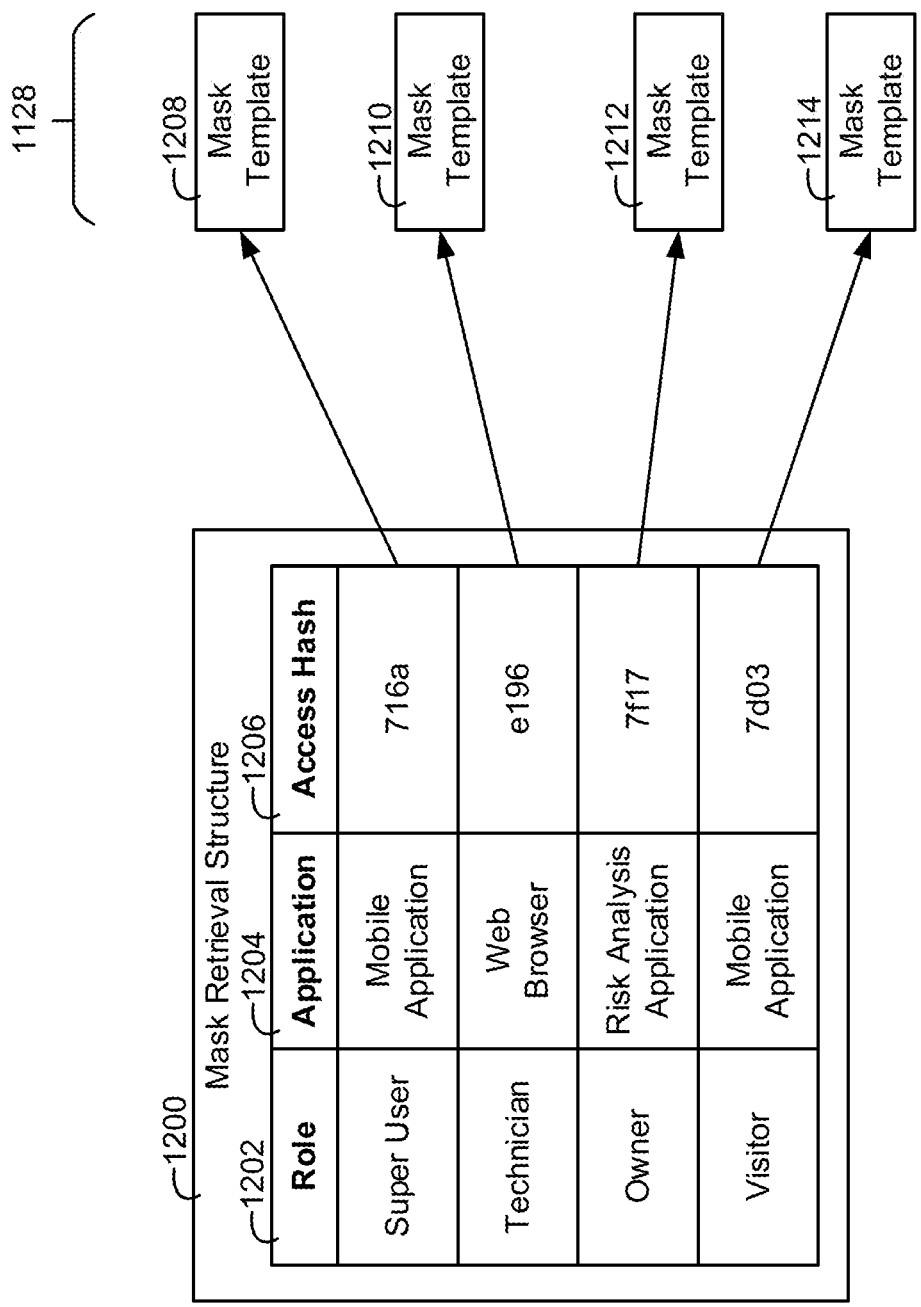
FIG. 12 is a block diagram of a mask retrieval structure for performing the private information management by the entity service of FIG. 11, according to an exemplary embodiment.

Referring now to FIG. 12, FIG. 12 includes a mask retrieval structure 1200 for retrieving one of the mask templates 1128 (mask templates 1208-1214), according to an exemplary embodiment. In some embodiments, the mask retrieval structure 1200 is implemented by the mask retriever 1138 as a lookup table for selecting a particular mask template of the mask templates 1128 as a function of the access values 1104 and/or the access hash key 1116. However, in some embodiments, the masking engine 1118 performs a search of the mask templates 1128 (each mask template storing a particular value for the access values 1104 and/or the access hash key 1116) and may not require the mask retrieval structure 1200. Regardless, the mask retrieval structure 1200 provides an example of the linkage between access values 1104 and/or the access hash key 1116 and the mask templates 1128 that can exist and can be identified via a search of the mask templates 1128.

In FIG. 12, each row of the mask retrieval structure 1200 is associated with a particular mask template of the mask templates 1128 in some embodiments. The mask template can be associated with the particular row of the mask retrieval structure 1200 is a function of the values of the row (e.g., role, application, access hash). The mask retrieval structure incudes a column 1202 for the role identifier 1106 and a column 1204 for the application identifier 1112. Furthermore, the mask retrieval structure includes a column 1206 for the access hash key 1116. The mask retrieval structure 1200 can include any number of columns for any number of the access values 1104.

A particular role "Super User" and a particular application "Mobile Application" is linked to the mask template 1208. In some embodiments, the mask template 1208 includes the indication of "Super User" and the indication of "Mobile Application" in addition to multiple masking operators for masking private information. The masking engine 1118 can be configured search the mask templates 1128 (and/or the mask retrieval structure 1200) with the role identifier 1106 "Super User" and the application identifier 1112 "Mobile Application" and retrieve the mask template 1208 if the role identifier 1106 stored by the mask template 1208 has the value "Super User" and the application identifier 1112 stored by the mask template 1208 has the value "Mobile Application." Furthermore, mask retrieval structure 1200 can include an access hash "716a" which may correspond to a hash of "Super User" concatenated with "Mobile Application." The mask template 1208 may, in some embodiments, store the access hash "716a" such that the masking engine 1118 can be configured to search the mask templates 1128 with the access hash key 1116 and retrieve the mask template 1208 if the access hash key 1116 stored by the mask template 1208 has the value "716a."

Figure 13:
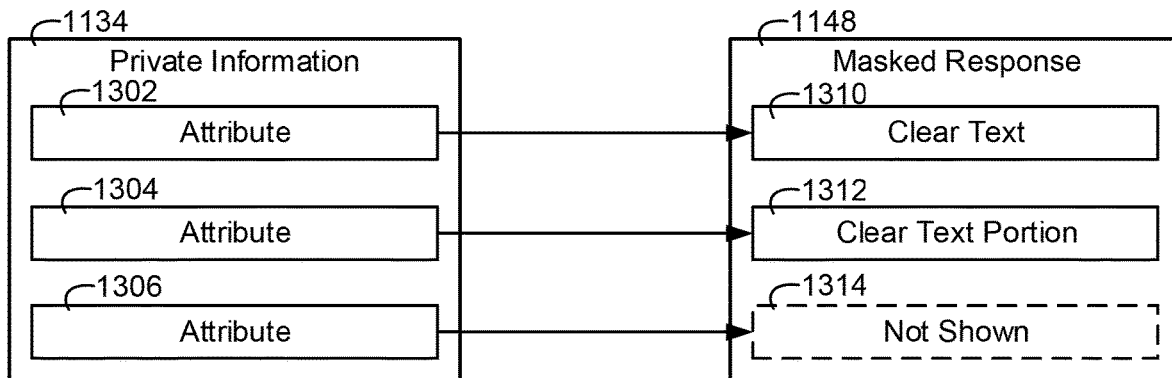
FIG. 13 is a block diagram of a private information data structure and masked response data structure, the masked response data structure generated by the entity service of FIG. 11 based on the private information data structure and a mask template of the mask templates of FIG. 12, according to an exemplary embodiment.

Referring now to FIG. 13, a block diagram of the private information 1134 and the masked response 1148 is shown, according to an exemplary embodiment. The private information 1134 can include multiple attributes, attribute 1302, attribute 1304, and attribute 1306. The private information 1134 can be any number of attributes. The attributes 1302-1306 can be any kind of private information, e.g., a phone number, a birthdate, a social security number, an address, a user name, a full name, an encryption key, a device identifier, a network address, a temperature data point, a humidity data point, a virtual point, and/or any other kind of information. Each of the attributes 1302-1306 map directly to one of masked attributes 1310-1314 of the masked response 1148. The masked attributes are clear text 1310, clear text portion 1312, and not shown 1314.

The clear text 1310 may be the exact value of attribute 1302 with no encryption and/or masking, i.e., it can be the attribute 1302 shown in the clear. For example, if the value of attribute 1302 is "John Smith" clear text 1310 may also be "John Smith." A clear text masking operator can be implemented by a particular mask of the mask templates 1128 to show the attribute 1302 as the clear text 1310.

The clear text portion 1312 can be a portion of the attribute 1304 shown in the clear. In some embodiments, only some of the characters or values of the attribute 1304 are shown in the clear text portion 1312. In some embodiments, some of the characters or values of the attribute 1304 are masked with a reference character (e.g., "*") For example, if the attribute 1304 is "John Smith" the clear text portion 1312 may be "John Smi" or "John Sm." For example, one masking operator of one of the mask templates 1128 may remove some of the characters and/or values of the attribute 1304 to generate the clear text portion 1312 while another (or the same) masking operator can replace some of the characters and/or values of the attribute 1304 with a Furthermore, the attribute 1306 can map to the not shown attribute 1314. The not shown attribute 1314 may be an empty data set, and/or may not be any attribute at all. In this regard, the masking engine 1118 can fully mask, e.g., remove, the attribute 1314. For example one of the mask templates 1128 may have a full mask operator configured to cause the attribute 1314 to not be shown in the masked response 1148**.

Figure 14:
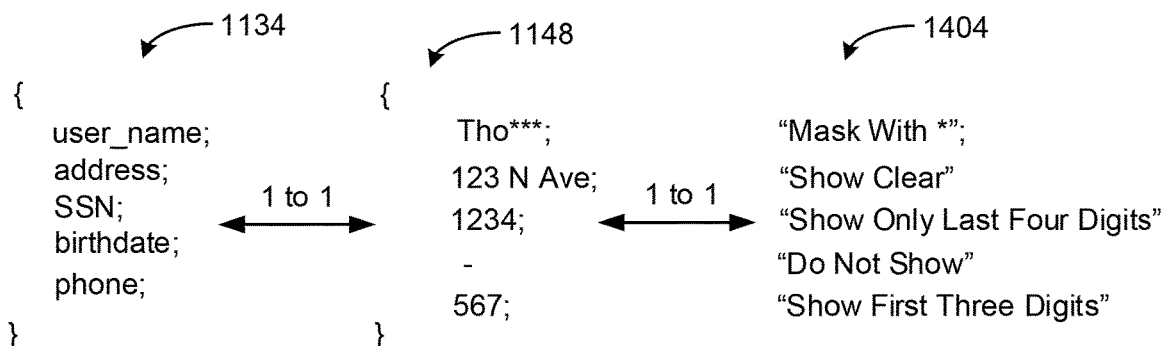
FIG. 14 is the private information data structure and the masked response data structure of FIG. 13 and masking operators of a mask template of the mask templates of FIG. 12, according to an exemplary embodiment.

Referring now to FIG. 14, the private information 1134, the masked response 1148, and masking operators 1404 of one of the mask templates 1128 are shown in greater detail, according to an exemplary embodiment. In FIG. 14, there is a one to one mapping between the attributes of the private information 1134, the attributes of the masked response 1148, and the masking operators 1404. In this regard, each of the masking operators 1404 (and each of the masking operators of each of the mask templates 1128) is configured to handle (mask) a particular linked private information attribute of the private information 1134.

In FIG. 14, the private information attribute "user_name" has a one to one correspondence to the masked attribute "Tho*." In this regard, the "user_name" may be "Thomas" while the masked attribute is "Tho*." The masking operating linked to the "user_name" and "Tho***" may be a masking operator configured to mask particular characters (e.g., the last three characters, the last four characters, the first two characters, etc.) with a "*" reference character. However, the reference character can be any character, e.g., "x," "#," "-," etc.

The attribute "address" of the private information 1134 can have a one to one correspondence to the masked attribute "123 N Ave." As can be seen, the masked attribute "123 N Ave." is shown in the clear, i.e., it is not masked. In this regard, a "shown in the clear" masking operator can be associated with the "address" attribute. Other types of masking operators can include encryption masking operators configured to perform a particular type of encryption (e.g., Rivest-Shamir-Adleman (RSA), Triple Data Encryption Algorithm (triple DES), Blowfish, Advanced Encryption Standard (AES), etc.). Another masking operator may be a masking operator configured to completely hide an attribute, i.e., not show the attribute. Furthermore, another masking operator may be configured to hide certain characters or values of an attribute, e.g., not show the first three digits of an attribute, not show the first two digits of an attribute, etc.

Figure 15:
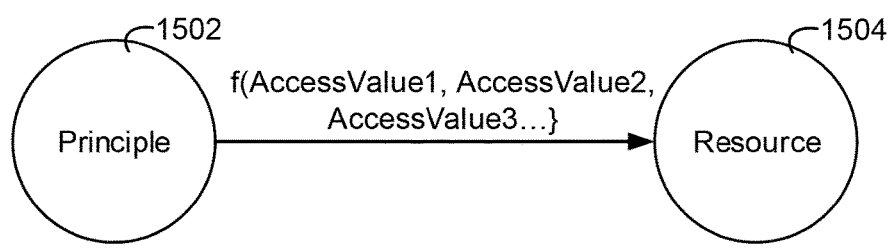
FIG. 15 is a block diagram illustrating selection by the entity service of FIG. 11 retrieving resource information for a principle as a function of multiple access values, according to an exemplary embodiment.

Referring now to FIG. 15, a diagram of access of a resource as a function of multiple access values is shown, according to an exemplary embodiment. In some embodiments, principle 1502 represents a particular accessing device, or requesting device, e.g., the client devices 548, BMS controller 466, etc. The access values may be the access values 1104. FIG. 15 illustrates that the principle 1502 has access to resource 1504 based on a function multiple access values. This access as a function of multiple values can be implemented through the mask templates 1128 which can be selected as a function of the multiple access values.

In some embodiments, the principle 1502 is a user device and the user device requests the resource 1504, is given access to the resource as a function of the access values, and the user device presents the resource 1504 to a user to review on a screen of the user device. For example, if the resource 1504 is a social security number, the user device may receive the social security number based on a function of the access values associated with the user device.

Figure 16:
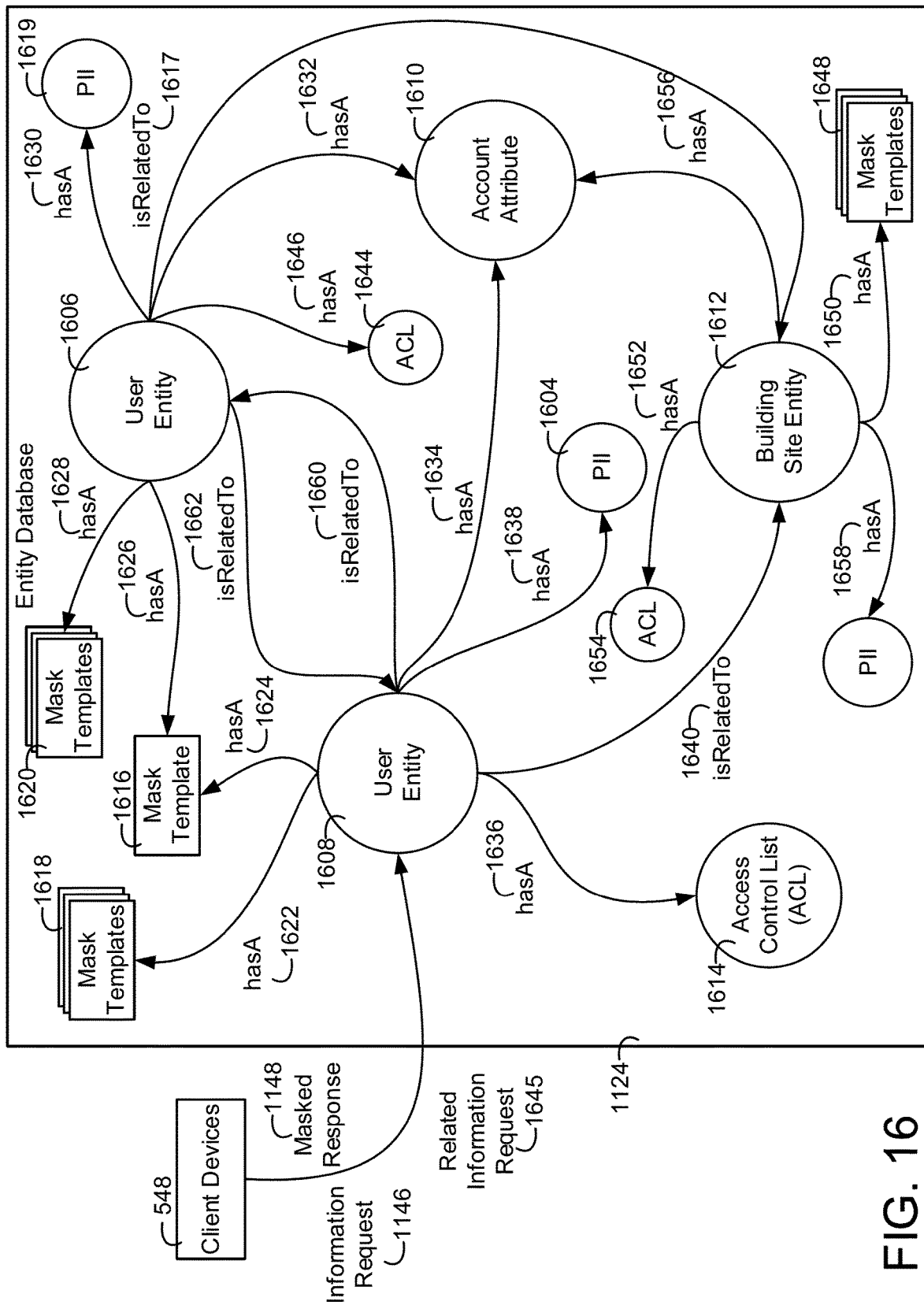
FIG. 16 is a block diagram of an entity database of the entity service of FIG. 11, the entity database including multiple interrelated entities including the mask templates of FIG. 11 and private information, according to an exemplary embodiment.

Referring now to FIG. 16, the entity database 1124 of FIG. 11 is shown in greater detail including multiple entities related to each other, according to an exemplary embodiment. In FIG. 16, the client devices 548 can generate queries (e.g., the information request 1146 and/or related information request 1645) for the entity database 1124. In some embodiments, the queries may be queries to the cloud entity service 626 which is configured to generate the masked response 1148 provided to the client devices 548 in response to the queries, the response generated by the masking engine 1118.

The client devices 548 can generate the related information request 1645. The related information request 1645 can be a request for private information of one entity and private information of another entity linked to the one entity. For example, user entity 1608 (object entity) hasA 1638 (relational entity) personal identifying information (PII) 1604 (data entity). Furthermore, user entity 1608 isRelatedTo 1662 (relational entity) user entity 1606 (object entity) and similarly, the relationship is transitive, user entity 1606 isRelatedTo 1662 user entity 1608. Furthermore, user entity 1606 hasA 1630 (relational entity) personal identifying information (PII) 1619 (data entity). This relationship between user entity 1608 and user entity 1606 can be reflexive such that a request for PII 1604 of user entity 1608, and information of entities related to user entity 1608 (e.g., PII 1619 of user entity 1606) may require the same (or similar) permissions for a request for PII 1619 of user entity 1606 and information of entities related to user entity 1606 (e.g., PII 1604 of user entity 1608). PII 1619 and PII 1604, in addition to PII 1664, can be the same and/or similar to the private information 1134.

In some embodiments, the relationships between entities of entity database 1124 (e.g., user entity 1608 and user entity 1606 via isRelatedTo 1662 and isRelatedTo 1660 (relational entity)) may have transitive closure. The transitive closure of a binary relation R on a set X is the smallest relation on X that contains R and is transitive. In this regard, the entity database 1124 can have transitive closure. In some embodiments, based on a given set of relations, the cloud entity service 626 can generate additional relations (or derive that there are additional relations). For example, if:

$$a \rightarrow b \rightarrow c$$

then the entity service 626 can be configured to generate (e.g., via Warshall's algorithm) additional relationships (the transitive closure) based on the relationship a→b→c such:

$$a \to b, b \to c, a \to c$$

User entity 1608 hasA 1636 (relational entity) ACL 1614 (data entity). The ACL 1614 may be the same as and/or similar to ACL 1136 as described with reference to FIG. 11. Furthermore, user entity 1606 hasA 1646 (relational entity) ACL 1644 (data entity). The ACL 1614 can define, e.g., can include a list of access values, what access values have access to private information of the user entity 1608. Similarly, the ACL 1644 can define, e.g., can include a list of access values, what access values have access to private information of the user entity 1606. In this regard, the masking engine 1118 (and/or the cloud entity service 626) can determine whether a request for private information of user entity 1608 and information related to user entity 1608 (e.g., the user entity 1606) should be granted in view of the access values and the ACL 1614 and the ACL 1644.

As an example, the ACL 1614 and the ACL 1644 may each store a list of roles as follows:

TABLE 1

| Access To User Entity 1608 |
| --- |
| ACL 1614 |
| Super User |
| Database Administrator |
| Guest User |

TABLE 2

| Access To User Entity 1606 |
| --- |
| ACL 1644 |
| Super User |
| Database Administrator |
| Front Desk |

If the role identifier 1106 of client devices 548 is "Super User," the masking engine 1118 can determine, whether client devices 548 has access to PII 1604 of user entity 1608 and information related user entity 1608, e.g., PII 1619 of user entity 1606. In the current example, since the client devices 548 is a "Super User," the masking engine 1118 can determine, based on the ACL 1614 and the ACL 1644, that the client devices 548 has access to both PII 1619 and PII 1604. The client devices 548 can be configured to retrieve a mask related to each of the user entities 1608 and user entity 1606 (e.g., the mask templates 1618 (data entity), the mask template 1616 (data entity), and/or the mask templates 1602) and mask the PII 1604 with a mask templated retrieved for the user entity 1608 and mask the PII 1619 with a mask retrieved for the user entity 1606.

As another example, if the role identifier 1106 of client devices 548 is "Guest User," the masking engine 1118 can determine, whether client devices 548 has access to PII 1604 of user entity 1608 and information related to PII 1619. In the current example, since the client devices 548 is a "Guest User," the masking engine 1118 can determine, based on the ACL 1614 and the ACL 1644, that the client devices 548 has access to PII 1604 but not to PII 1619. The masking engine 1118 can be configured to retrieve a mask related of the user entities 1608 but not the user entity 1606 and mask the PII 1604 with a mask templated retrieved for the user entity 1608.

In some embodiments, the masked results are joined together to be provided to the client devices 548. In some embodiments, the masking engine 1118 can be configured to automatically determine whether client devices 548 has access to information related to user entity 1608 in response to receiving the information request 1146 and can be configured to join the masked information of the user entity 1608 and the user entity 1606 together into the masked response 1148. In some embodiments, the masking engine 1118 can be configured to determine and join related information only if the original request is a request for related information, e.g., the related information request 1645.

User entity 1608 hasA 1622 (relational entity) mask templates 1618 and hasA 1624 (relational entity) mask template 1616. Furthermore, user entity 1606 hasA 1628 (relational entity) mask templates 1620 (data entity) and hasA 1626 (relational entity) the mask template 1616. This illustrates that multiple user entities can have their own mask templates and/or can share (both be linked to) a common one or multiple mask templates. In this regard, the masking engine 1118 can be configured, based on the relationships of the entity database 1124, to retrieve and mask private information for multiple entities with the same mask or with different masks. In some embodiments, certain types of object entities are linked to specific sets of mask templates. For example, all thermostat object entities may be linked to a set of thermostat specific mask templates while all building occupants are linked to a set of building occupant mask templates.

FIG. 16 includes an account attribute 1610 (data entity). The user entity 1608, the user entity 1606, and a building site entity 1612 (object entity) can each be linked to the account attribute 1610, i.e., user entity 1608 hasA 1634 (relational entity) account attribute 1610, user entity 1606 hasA 1632 (relational entity) account attribute 1610, and the building site entity 1612 hasA 1656 (relational entity) account attribute 1610. Furthermore, user entity 1606 isRelatedTo 1617 (relational entity) building site entity 1612. Building site entity 1612 is another example of an object entity and may have its own PII 1664 (data entity), i.e., building site entity 1612 hasA 1658 (relational entity) PII 1664. The building site entity 1612 also has its own mask templates 1648 (data entity), i.e., building site entity 1612 hasA 1650 (relational entity) mask templates 1648. The building site entity 1612 hasA 1652 (relational entity) ACL 1654 (data entity).

In some embodiments, if the client devices 548 requests the account attribute 1610, the masking engine 1118 can be configured to determine, based on the object entities linked to the account attribute 1610 and ACLs for each of the object entities, whether the client devices 548 is associated with a principle included in each of the ACLs. Furthermore, in some embodiments, the masking engine 1118 can mask the account attribute 1610 with multiple retrieved masks in response to a determination that the client devices 548 has access to the account attribute 1610. For example, the masking engine 1118 can retrieve a mask template for user entity 1608, a mask template for user entity 1606, and a mask template for building site entity 1612. The highest level of security of each masking operator of the retrieved mask templates can be applied on the account attribute 1610.

For example, if one mask template has a show in clear operator and another mask template has a do not show operator for the same attribute of account attribute 1610, the masking engine 1118 can mask the account attribute with the do not show operator since that masking operator is the highest level of security. Furthermore, if, for another attribute of account attribute 1610, there is a show in clear operator, a mask first character operator, and a mask first two characters operators, the masking operator can be configured to mask the attribute with the first two characters operator.

In some embodiments, the building site entity 1612 represents a particular building (e.g., the school 110, the hospital 120, the factory 130, and/or the office 140 as described with reference to FIG. 1.) The PII 1664 may be building information such as an address, a building security access code, a building temperature, etc. The user entity 1608 isRelatedTo 1640 (relational entity) the building site entity 1612.

Figure 17:
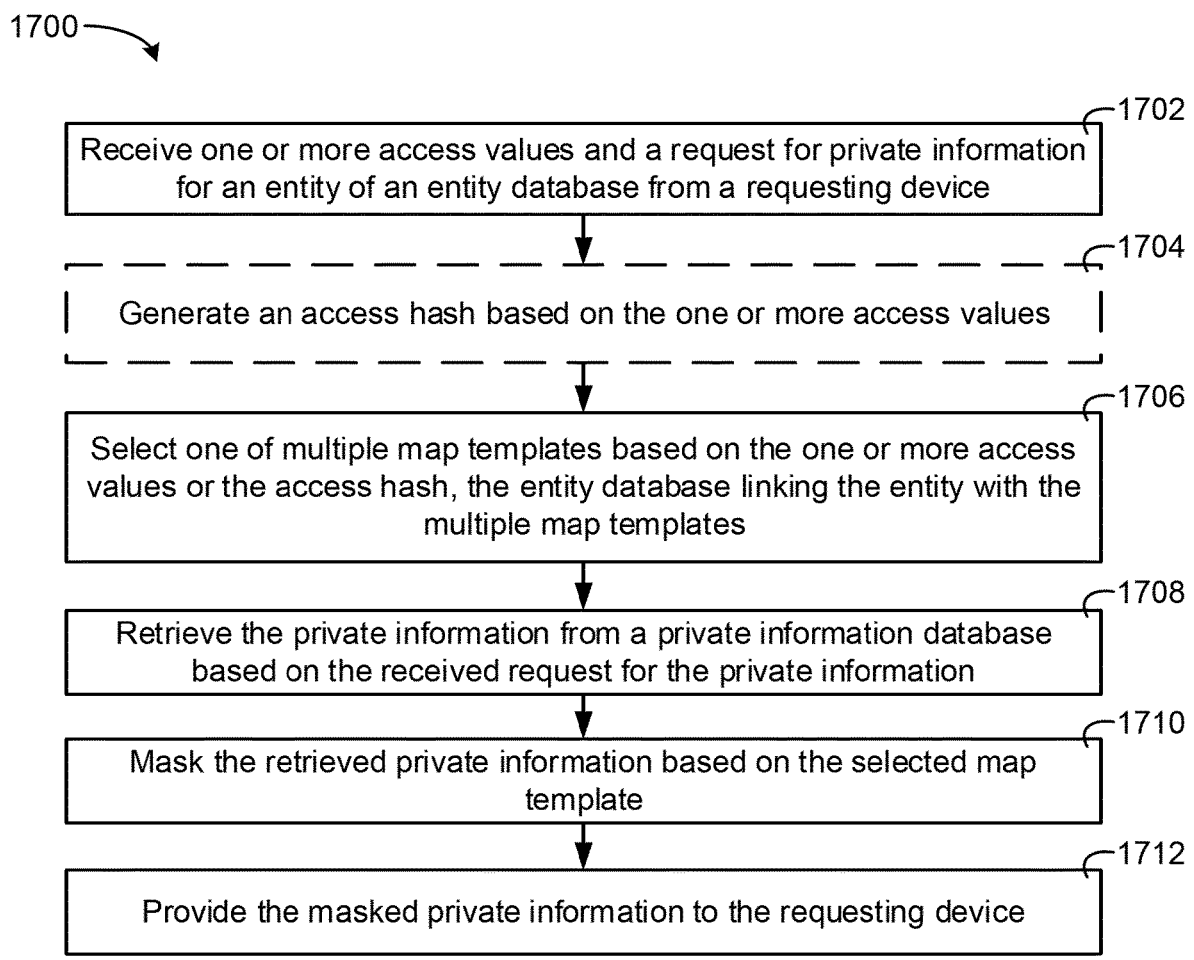
FIG. 17 is a flow diagram of a process for masking private information of a building entity with a mask template that can be performed by the entity service of FIG. 11, according to an exemplary embodiment.

Referring now to FIG. 17, a process 1700 for masking private information with mask templates is shown, according to an exemplary embodiment. The cloud entity service 626 is configured to perform the process 1700 in some embodiments. More specifically, the masking engine 1118, the external interface 1102, the hash manager 1114, and/or the entity database 1124 are configured to perform the process 1700 in some embodiments. Furthermore, any computing device as described herein can be configured to perform the process 1700.

In step 1702, the external interface 1102 receives the information request 1146 (and/or the related information request 1645), the information request 1146 being a request for the private information 1134 of the entity 1126 linked to the entity 1126. The information request 1146 may indicate specific information of the private information 1134, e.g., specifically indicate the private information 1134, or may indicate the entity 1126 and a request for any stored private information linked to the entity 1126.

In some embodiments, the external interface 1102 provides the information request 1146 to the masking engine 1118. Based on the information request 1146, the masking engine 1118 can determine whether the information request 1146 is a request for the private information 1134 or a request for public information. If the request is for public information, the masking engine 1118 can be configured to provide the public information to the client devices 548 without masking, if the request is for the private information 1134, the masking engine 1118 can perform the steps 1704-1712 of the process 1700.

In the step 1704, the hash manager 1114 can generate the access hash key 1116 based on the access values 1104. The access values 1104 may be values received from the client devices 548 or retrieved for the client devices 548 (e.g., retrieved by the external interface 1102 based on login credentials of the client devices 548). In some embodiments, the hash manager 1114 can concatenate multiple access values together and hash the resulting concatenation of access values to generate the access hash key 1116. In some embodiments, the step 1704 is an optional step, thus the step 1704 is shown in dashed lines in FIG. 17.

In the step 1706, the masking engine 1118 can select one of the mask templates 1128. The masking engine 1118 can select the one of the mask templates 1128 based on the access values 1104 and/or based on the access hash key 1116. In some embodiments, each of the mask templates 1128 stores or is associated with, a particular combination of values of the access values 1104 and/or the access hash key 1116. In this regard, the masking engine 1118 can perform a search of the mask templates 1128 with the access values 1104 and/or the access hash key 1116 to identify the mask template associated with the particular access values 1104 and/or the particular access hash key 1116. In some embodiments, the masking engine 1118 can store and/or operate based on a mask retrieval structure which may link particular values of the access values 1104 and/or the access hash key 1116 to specific mask templates of the mask templates 1128.

The masking engine 1118 can determine which mask templates to select from based on relational links between the entity for which information is requested and the mask templates to select from. For example, in FIG. 16, user entity 1608 can be linked to mask templates 1618 and mask template 1616 while building site entity 1612 can be linked to mask templates 1648. In this regard, a request for private information of the user entity 1608 may result in a mask selection from the mask templates 1618 and mask template 1616 while a request for private information of the building site entity 1612 may result in a selection of a mask template of the mask templates 1648.

In the step 1708, the masking engine 1118 can be configured to retrieve the private information 1134 from a private information storage database. In some embodiments, the private information 1134 is stored directly in the entity database 1124. In some embodiments, the private information 1134 is stored encrypted in encrypted data storage 1122. In this regard, the masking engine 1118 can query either or both of the entity database 1124 and the encrypted data storage 1122 for the private information 1134.

In step 1710, the masking engine 1118 can mask the private information 1134 based on the selected mask of the step 1706. In some embodiments, the private information 1134 includes one or multiple attributes. Each of the attributes of the private information 1134 may have a one to one mapping with masking operators of the selected mask template of the step 1706. This is further described with reference to FIG. 14. In the step 1712, the resulting masked private information can be provided by the masking engine 1118 to the external interface 1102 which can in turn provide the masked response 1148, a message that is or includes the masked data structure determined in the step 1715, to the client devices 548.

Figure 18:
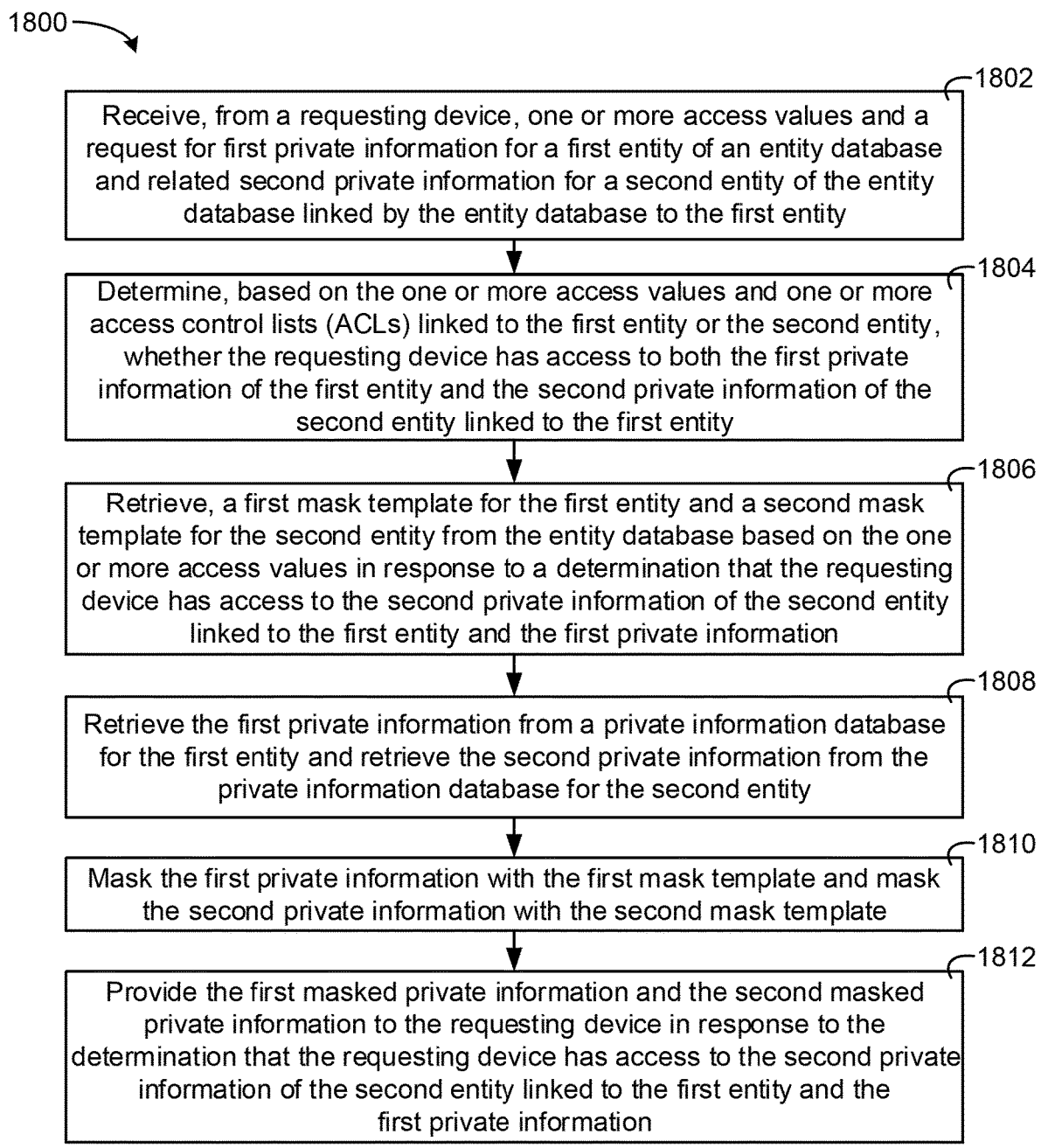
FIG. 18 is a flow diagram of a process for masking private information of a first building entity and masking private information of a second building entity related to the first building entity by the entity service of FIG. 11, according to an exemplary embodiment.

Referring now to FIG. 18, a process 1800 for masking private information of two different linked entities with mask templates is shown, according to an exemplary embodiment. The cloud entity service 626 is configured to perform the process 1800 in some embodiments. More specifically, the masking engine 1118, the external interface 1102, the hash manager 1114, and/or the entity database 1124 are configured to perform the process 1800 in some embodiments. Furthermore, any computing device as described herein can be configured to perform the process 1800.

In step 1802, the external interface 1102 can receive one or more access values 1104 and a request for first private information for a first entity of the entity database 1124 and related second private information of a second entity of the entity database 1124 linked by the entity database 1124 to the first entity (and/or vice versa, the first entity linked to the second entity). For example, the external interface 1102 and/or the masking engine 1118 can receive an information request for private information of the user entity 1608 and the user entity 1606. However, the information request may not necessarily be for the user entity 1608 and the user entity 1606 and can be for any type of entity or building related entity (e.g., a building site entity, a building device entity, etc.) The entity database 1124 can link the user entity 1608 to the user entity 1606 and the user entity 1606 to the user entity 1608 via the relational entities isRelatedTo 1662 and isRelatedTo 1660. The information request may be the related information request 1645 and can indicate that the client devices 548 is querying the system for private information of the user entity 1608 and private information of other entities related to the user entity 1608 (or specifically to private information of user entity 1608 and private information of user entity 1606).

In step 1804, the masking engine 1118 can determine, based on the one or more access values 1104 and one or more ACLs linked to the first entity or the second entity, whether the user devices 584 has access to both the first private information of the first entity and the second private information of the second entity linked to the first entity. For example, based on the access values 1104, the masking engine 1118 and one or multiple ACLs, e.g., the ACLs linked to the user entity 1608 and the user entity 1606 (e.g., the ACL 1614 and the ACL 1644) whether the client devices 548 have access to both the user entity 1608 and the user entity 1606. In response to a determination that the client devices 548 has access to both the user entity 1608 and the user entity 1606, the masking engine 1118 can mask and provide private information for both entities to the client devices 548. If the masking engine 1118 determines, based on the access values 1104 and the ACLs, that the client devices 548 has access to both the user entity 1608 and the user entity 1606.

In step 1806, the masking engine 1118 can retrieve a first mask template for the first entity and a second mask template for the second entity from the entity database 1124 based on the one or more access values 1104 in response to a determination that user devices 548 has access to the second private information of the second entity linked to the first entity and the first private information. For example, the masking engine 1118 can be configured to retrieve a mask template for the user entity 1608 and a mask template for the user entity 1606. In some embodiments, the masking engine 1118 can perform the step 1806 in response to a determination that the client devices 548 has access to the private information of the user entity 1608 and the user entity 1606 as determined in the step 1804. In some embodiments, the masking engine 1118 can select the mask template for the user entity 1608 from the mask templates 1618 and the mask template 1616 while the masking engine 1118 can select the mask template for the user entity 1606 from the mask templates 1620 and the mask template 1616. The selections of mask templates can be made via the access values 1104 and/or the access hash key 1116. For example, via a lookup table and/or via a search, the masking engine 1118 can determine the mask templates that are associated with the particular values of the access values 1104 and/or the access hash key 1116.

In some embodiments, to perform the selection of a mask template for an entity, the masking engine 1118 can determine a set of mask templates linked to the entity via the entity database 1124. For example, the masking engine 1118 could for the building site entity 1612, determine that the building site entity 1612 is linked to the mask templates 1648 via the relational entity, hasA 1650. In this regard, the masking engine 1118 would select a mask template of the mask templates 1648 since the building site entity 1612 is linked to the mask templates 1648 but would not select one of the mask templates 1620 linked to the user entity 1606 since the mask templates 1620 are not linked to the building site entity 1612.

In step 1808, the masking engine 1118 can retrieve the first private information from a private information database for the first entity and retrieve the second private information from the private information database for the second entity. For example, the masking engine 1118 can retrieve the PII 1604 for the user entity 1608, based on the relational entity hasA 1638, and retrieve the PII 1619, based on the relational entity hasA 1630. In some embodiments, the private information database is the entity database 1124, and in this regard, the masking engine 1118 can retrieve the private information from the entity database 1124. In some embodiments, the private information database is the encrypted data storage 1122 and in this regard, the private information can be retrieved from the encrypted data storage 1122.

In step 1810, the masking engine 1118 can mask the first private information with the first mask template retrieved in the step 1806 and mask the second private information with the second mask template retrieved in the step 1806. For example, the masking engine 1118 can mask the first private information with the first mask template and mask the second private information with the second mask template. For example, the masking engine 1118 can mask the PII 1604 for the user entity 1608 with the mask template selected from the mask templates 1618 and the mask template 1616. Furthermore, the masking engine 1118 can mask the PII 1619 for the user entity 1606 with the mask template selected from the mask templates 1620 and the mask template 1616.

In step 1812, the masking engine 1118 can provide the first masked private information and the second masked private information to the user devices 548 in response to the determination that the user devices 548 has access to the second private information of the second entity linked to the first entity and the first private information. For example, the masking engine 1118 can provide the masked first private information and the masked second private information to the client devices 548 via the external interface 1102. In some embodiments, the masking engine 1118 provides the masked response 1148 to the external interface 1102, the masked response including the first private information and the second private information. In some embodiments, the masking engine 1118 may only provide the first masked private information and the second masked private information in response to the determination that the client devices 548 has access to both the private information of the first entity and the private information of the second entity as determined in the step 1804.

Entity Database With Transitive Closure

Figure 19A:
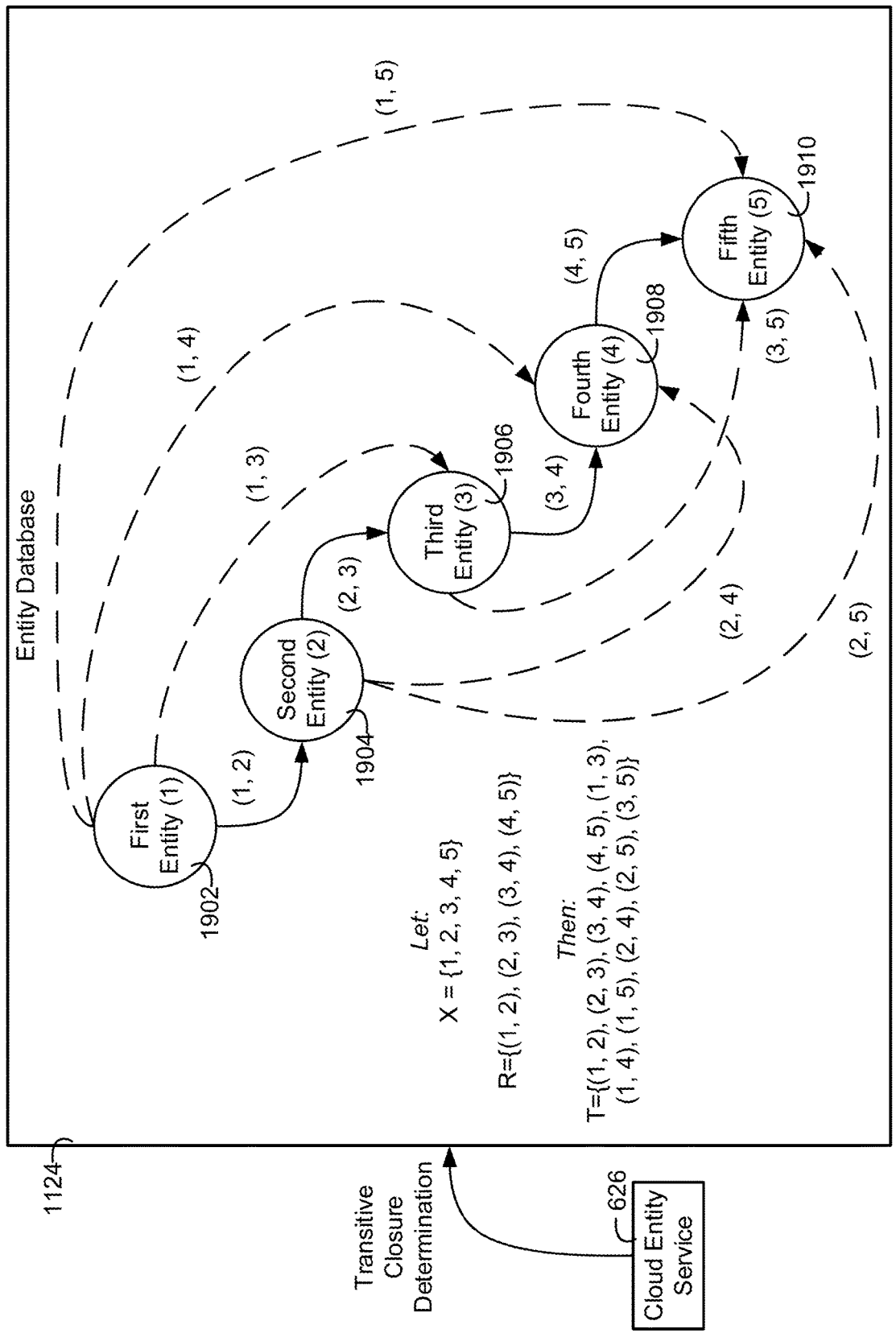
FIG. 19A is another block diagram of the entity database of the entity service of FIG. 11 where the entity service of FIG. 11 determines a transitive closure for the entity database, according to an exemplary embodiment.

Referring now to FIG. 19A, the entity database 1124 and the entity service 626 is shown where the entity service 626 determines a transitive closure for the entities of the entity database 1124, according to an exemplary embodiment. Entity database 1124 includes a first entity 1902, a second entity 1904, a third entity 1906, a fourth entity 1908, and a fifth entity 1910, in some embodiments. The entity database 1124 can include any number of entities and can determine a transitive closure for any number of entities and any relations between the entities (e.g., as defined by relational entities). The entities 1902-1910 can be an object entity, a class entity, a data entity and can represent people, places, buildings, devices, and/or any other device, system, building, or person as described herein.

The entity service 626, for a set of entities (e.g., the entities 1902-1910) and a set of relations between the entities of the entity database 1124 (e.g., the relations shown in solid lines), is configured to determine a transitive closure for the entity database 1124 in some embodiments. Furthermore, based on the transitive closure, the cloud entity service 626 can add additional relations between the entities (e.g., the relations shown in dashed lines). The transitive closure of a binary relation R on a set X is the smallest relation on X that contains R and is transitive. Given a set X, e.g., entities 1902-1910, and relationships between the entities R (e.g., relational entities), the cloud entity service 626 can determine a transitive closure T. The cloud entity service 626 can use any kind of transitive closure calculation algorithm, for example, the Floyd Warshall Algorithm.

Representing each of the entities 1902-1910 as 1, 2, 3, 4, and 5 respectively, and a relation between entities as (x, y), let:

$$X=\{1,2,3,4,5\}$$

$$R=\{(1,2),(2,3),(3,4),(4,5)\}$$

then the transitive closure T, that the cloud entity service 626 can be configured to determine is:

$$T=\{(1,2),(2,3),(3,4),(4,5),(1,3),(1,4),(1,5),(2,4),(2,5),(3,5)\}$$

By determining a transitive closure for the entity database 1124, direct links between entities can be determined. By resolving the direct links, a database operator can easily see the direct relations between entities and can understand which entities may be linked to different types of information.

For example, the access that different object entities have to certain private information may be defined based on a direct link between the object entity and the private information. For example, if the real-world system represented by the object entity queries the entity database 1124 for the private information, the cloud entity service 626 can determine that that real-world system has access to the private information based on the direct link. If the first entity 1902 is a thermostat and the fifth entity 1910 is timeseries data that the thermostat operates based on, without the transitive closure (the dashed lines) a database manager setting up the entity database 1124, and/or the cloud entity service 626, may not discern that the first entity 1902 is linked to the fifth entity 1910 since no direct link is shown, only indirect links through entities 1904-1908. However, once the transitive closure is determined for the entity database 1124, the direct link, i.e., the link (1, 5) between the first entity 1902 and the fifth entity 1910 is available and can be added by the cloud entity service 626 as a link to the entity database 1124. The determination of a transitive closure and the addition of links to the entity database 1124 based on the transitive closure can implement dynamic inheritance.

The graphical representation of entities shown in FIG. 19A, and furthermore in FIG. 19B, FIG. 11, FIGS. 20-21, FIGS. 23-24, and FIGS. 26-27 can be visually displayed to a database manager via a display screen of a user device, the client devices 548. In this regard, the database manager may provide input (e.g., new entities, new relationships between entities, construction of the database, etc.) to the cloud entity service 626. In response to new data, in response to a period occurring (e.g., an hourly period, a daily period, a weekly period, a monthly period), in response to a transitive closure calculation command from the client devices 548, and/or a query to entity database 1124 for information, the cloud entity service 626 can determine the transitive closure for the entity database 1124 and add new relations based on the transitive closure (e.g., the relations of the transitive closure not included in the original set of relations of the entity database 1124) to the entity database 1124.

By allowing a database manager to edit the entity database 1124 and then determining the transitive closure and adding additional relations to the entity database 1124 for user review, the database manager can understand all links, particularly direct links. Since the direct links may identify which entities have access to what data, this can help a database manager understand what systems will be able to access what information.

Figure 19B:
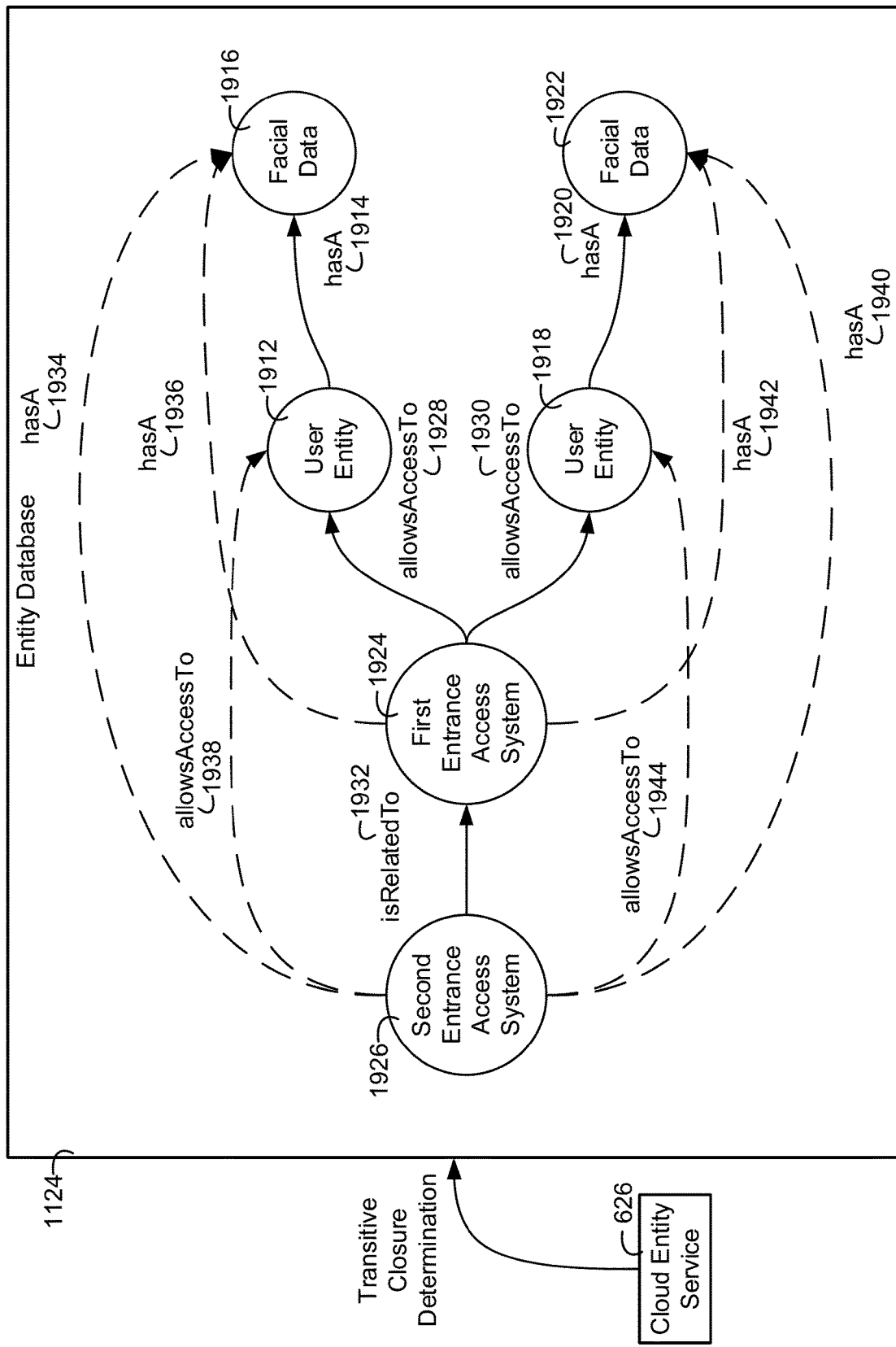
FIG. 19B is another block diagram of the entity database of the entity service of FIG. 11 where the entity service of FIG. 11 determines a transitive closure for the entity database to determine inheritance of information for access control systems, according to an exemplary embodiment.

Referring now to FIG. 19B, the entity database 1124 is shown storing facial data associated with particular users which are linked to access control systems for a building, according to an exemplary embodiment. Assuming that the graphical representation of the entity database 1124 of FIG. 19B is provided to a database manager, the database manager (or the system can automatically define) that user entity 1912 (object entity) hasA 1914 (relational entity) facial data 1916 (data entity). The facial data 1916 may be the image of a face or data pertaining to the face of a user represented by the user entity 1912. Similarly, user entity 1918 (object entity) hasA 1920 (relational entity) facial data 1922 (data entity).

The building may have two different entrances, a first entrance and a second entrance. A first security system (e.g., a system including multiple cameras, gates, alarms, sensors, image processing systems, etc.) may be installed at the first entrance for performing access control to the building at the first entrance. A second security system may be installed at a second entrance for performing access control to the building at the second entrance. The first security system and the second security system can be the same and/or similar to the security building subsystem 538 as described with reference to FIG. 5. A database manager can define the first security system and the second security system as a first entrance access system 1924 (object entity) and a second entrance access system 1926 (object entity).

Furthermore, the database manager can define that the first entrance access system 1924 allowsAccessTo 1928 (relational entity) the user entity 1912 and allowsAccessTo 1930 (relational entity), the user entity 1918. Furthermore, the database manager may determine that since the second security system and the first security system guard the same building, that the second entrance access system 1926 isRelatedTo 1932 (relational entity) the first entrance access system 1924.

In some embodiments, the first security system and the second security system includes cameras that capture images of the faces of the users represented by the user entity 1912 and the user entity 1918 and determines whether to grant these users access based on the facial data 1916 and the facial data 1922. In the entity database 1124, access to the facial data 1916 and the facial data 1922 may be defined based on relational entities. Ignoring the relations shown in dashed lines, only the user entity 1912 and the user entity 1918 may have access to the facial data 1916 and the facial data 1922, therefore, only a masking request by either the user entity 1912 or the user entity 1918 will result in the delivery and/or masking of the facial data 1916 and the facial data 1922 respectively.

However, if the cloud entity service 626 determines a transitive closure for the entity database 1124 (e.g., automatically or per request by the database manager via the client devices 548) additional relations between the entities of the entity database 1124 can be generated establishing that the second entrance access system 1926 and the first entrance access system 1924 also have access to the facial data 1916 and the facial data 1922 (the relations shown in dashed lines). The new relations that the cloud entity service 626 can be configured to add to the entity database 1124 based on the determination of the transitive closure may be the relational entities, hasA 1934, hasA 1936, allowsAccessTo 1938, hasA 1940, hasA 1942, and allowsAccessTo 1944. These relations implement a dynamic inheritance that can continuously be updated and/or modified as new entities or relations are added to the entity database 1124 via the determination of a transitive closure.

Referring now to FIGS. 20 and 21, the entity database 1124 is shown where a determination of a transitive closure for the entity database 1124 for a new object entity being added to the entity database 1124 is performed, according to an exemplary embodiment. The cloud entity service 626 is shown to receive a new entity for addition to the entity database 1124, the new entity being linked to an existing object entity 2002 of the entity database 1124. In some embodiments, the indication to add the new entity and the link to be established between the new entity and the existing entity may be generated by a database manager via the client devices 548. In response to the request, the cloud entity service 626 can cause the entity database 1124 to add a new object entity 2006 and a relational entity, hasA 2012, to mask templates 2008 (data entity) for the new object entity 2006. Since the request indicated the relation between the new entity and the existing entity, the cloud entity service 626 can cause the new object entity 2006 to be linked to the existing object entity 2002 via the relational entity, isRelatedTo 2014.

In response to adding the new object entity 2006, the mask templates 2008, and the relational entities hasA 2012 and isRelatedTo 2014, the cloud entity service 626 can determine a transitive closure for the entity database 1124 and add an additional link between the new object entity 2006 and PII 2004 based on the transitive closure. In this regard, both the existing object entity 2002 and the new object entity 2006 are linked to the PII 2004 via relational entities hasA 2010 and hasA 2016.

Since the new object entity 2006 and the existing object entity 2002 are linked to the PII 2004, a request for private information for the existing object entity 2002 may cause the PII 2004 to be retrieved and masked. Furthermore, a request for private information of the new object entity 2006 may cause the PII 2004 to be retrieved (the private information identified via the relational entity hasA 2016 added based on the determination of the transitive closure) and masked via a selected mask template of the mask templates 2008.

Figure 22:
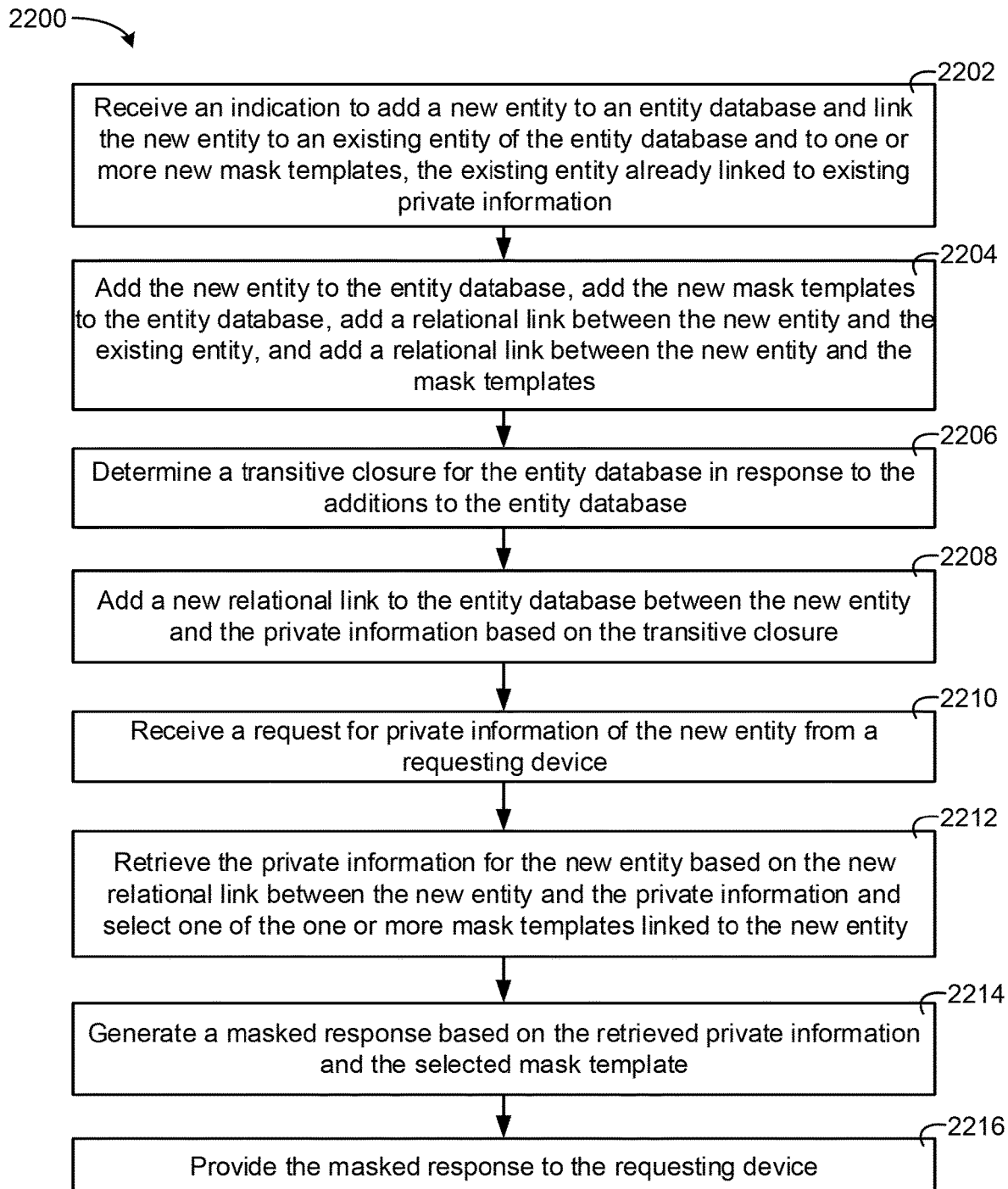
FIG. 22 is a flow diagram of a process for adding the new object entity to the entity database of FIGS. 20-21 and determining the transitive closure for the entity database, according to an exemplary embodiment.

Referring now to FIG. 22, a process 2200 for adding a new entity to the entity database 1124 and determining a transitive closure to update the entity database 1124 is shown, according to an exemplary embodiment. The cloud entity service 626 is configured to perform the process 2200 in some embodiments. Furthermore, the masking engine 1118, the external interface 1102, the hash manager 1114, and/or the entity database 1124 are configured to perform the process 2200 in some embodiments. Any computing device as described herein can be configured to perform the process 2200.

In step 2202, the cloud entity service 626 receives an indication to add a new entity to the entity database 1124, the new entity linked to an existing entity of the entity database and to one or more mask templates, the existing entity linked to private information. For example, the cloud entity service 626 can receive an indication to add the new object entity 2006 and link the new object entity 2006 to the existing object entity 2002. The existing object entity 2002 is linked to the PII 2004.

In step 2204, the cloud entity service 626 adds the new entity to the entity database 1124, adds the new mask templates to the entity database 1124, adds a relational link between the new entity and the existing entity, and adds a relational link between the new entity and the mask templates. For example, the cloud entity service 626 can cause the entity database 1124 to add the new object entity 2006, a relational entity isRelatedTo 2014 which links the new object entity 2006 to the existing object entity 2002. Furthermore, the cloud entity service 626 can cause the entity database 1124 to add the mask templates 2008 to the entity database 1124 and the relational entity hasA 2012 linking the new object entity 2006 to the mask templates 2008.

In step 2206, the cloud entity service 626 can determine a transitive closure for the entity database 1124 in response to the additions to the entity database 1124. For example, the cloud entity service 626 can identify all of the entities of the entity database 1124 and which of the entities represent relations between entities. Based on the links and the entities, the cloud entity service 626 can determine the transitive closure for the entity database 1124 which may be indicative of additional direct links between entities (e.g., links via relational entities) that did not previously exist in the entity database 1124.

In step 2208, the cloud entity service 626 can add new relational links based on the transitive closure to the entity database, specifically, a relational link between the new entity and the private information. For example, the cloud entity service 626 can add the relational entity hasA 2016 to the entity database 1124. The cloud entity service 626 can determine which direct links are missing from the entity database 1124 based on the transitive closure and add any missing links, in this instance, the relational entity hasA 2016 linking the new object entity 2006 to the PII 2004.

Since the new relational link has been added to the entity database 1124 between the new entity and the private information, a request for the private information for the new entity may result in the retrieval of the private information now linked to the new entity and masking via a selection of one of the new masks linked to the new entity. The steps 2210-2216 describe this masking can be the same as and/or similar to the steps of the process 1700 as described with reference to FIG. 17.

Figure 23:
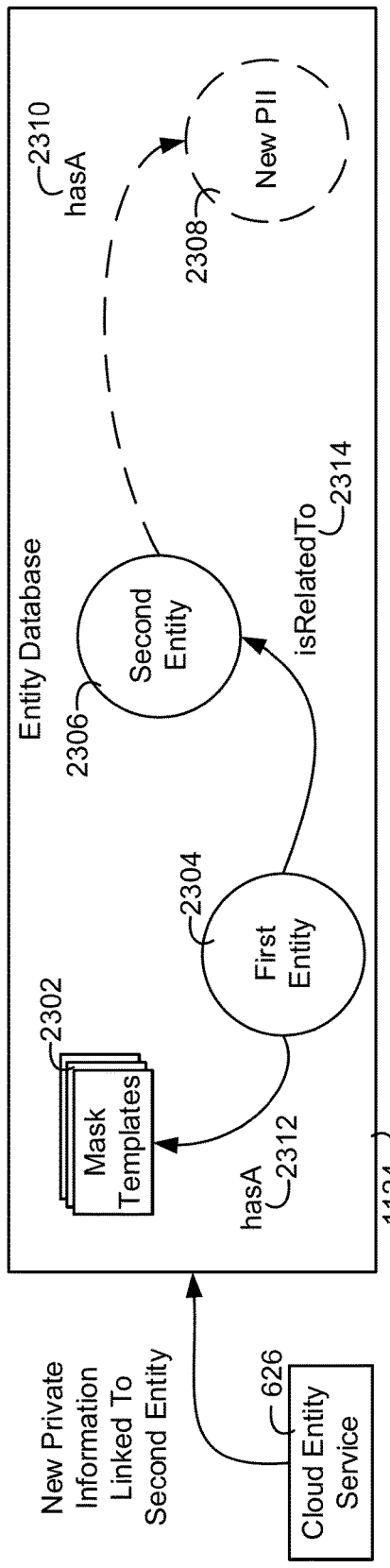
FIG. 23 is another block diagram of the entity database of the entity service of FIG. 11 where new PII is added to the entity database, according to an exemplary embodiment.
Figure 24:
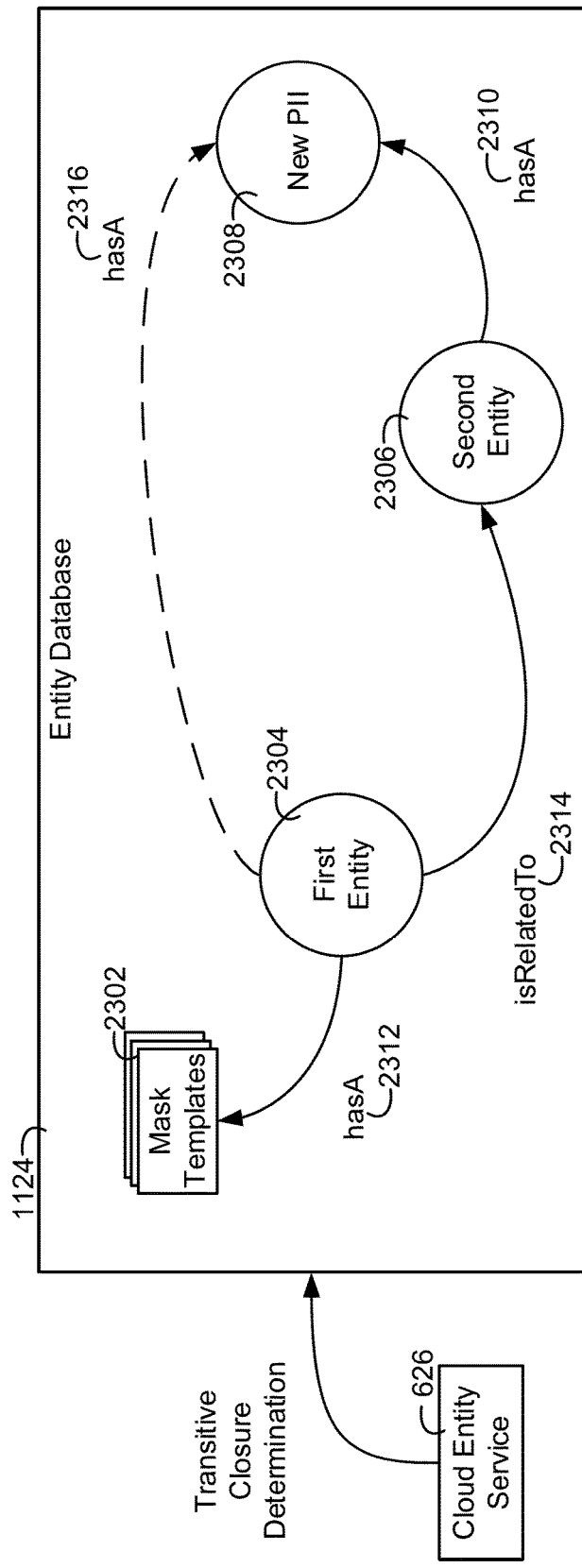
FIG. 24 is another block diagram of the entity database of FIG. 23 where a transitive closure is determined by the entity service of FIG. 11 for the entity database based on the new PII being added to the entity database, according to an exemplary embodiment.

Referring now to FIGS. 23-24, the entity database 1124 is shown where a determination of a transitive closure for the entity database 1124 for new PII being added to the entity database 1124 is performed, according to an exemplary embodiment. Cloud entity service 626 can receive an indication to add new private information to the entity database 1124 and to link the new private information to a second entity of the entity database 1124. For example, the indication may be received from a database manager from one of the client devices 548 and/or from any other system. The cloud entity service 626, in response to receiving the indication, can cause the entity database 1124 to be updated to include new PII 2308 (object entity) and a relational entity hasA 2310 linking the second entity 2306 to the new PII 2308.

In response to adding the new PII 2308 and the hasA 2310 to the entity database 1124, the cloud entity service 626 can determine a transitive closure for the entity database 1124. The transitive closure can indicate a relationship that does not exist in the entity database 1124, e.g., a link, between a first entity 2304 (object entity), which hasA 2312 (relational entity) mask templates 2302 (data entities) and isRelatedTo 2314 (relational entity) the second entity 2306, to the new PII 2308. In this regard, based on the transitive closure, the cloud entity service 626 can identify a direct link that does not currently existing in the entity database 1124 that should exist based on the current links in the entity database 1124. In this instance, the direct link is the link between the first entity 2304 and the new PII 2308 and the cloud entity service 626 can add the relational hasA 2316 to represent the link between the first entity 2304 and the new PII 2308.

Based on the new link between the first entity 2304 and the new PII 2316, a query for private information of the first entity 2304 and/or the second entity 2306 can result in the retrieval and masking of the new PII 2308. For the first entity 2304, if a request is received for private information of the first entity 2304, the cloud entity service 626 can determine that the new PII 2308 is private information of the first entity 2304 based on the relational entity hasA 2316 and can retrieve the new PII 2308 and mask the new PII 2308 with one of the mask templates 2302 linked to the first entity 2304 via the relational entity hasA 2312.

Figure 25:
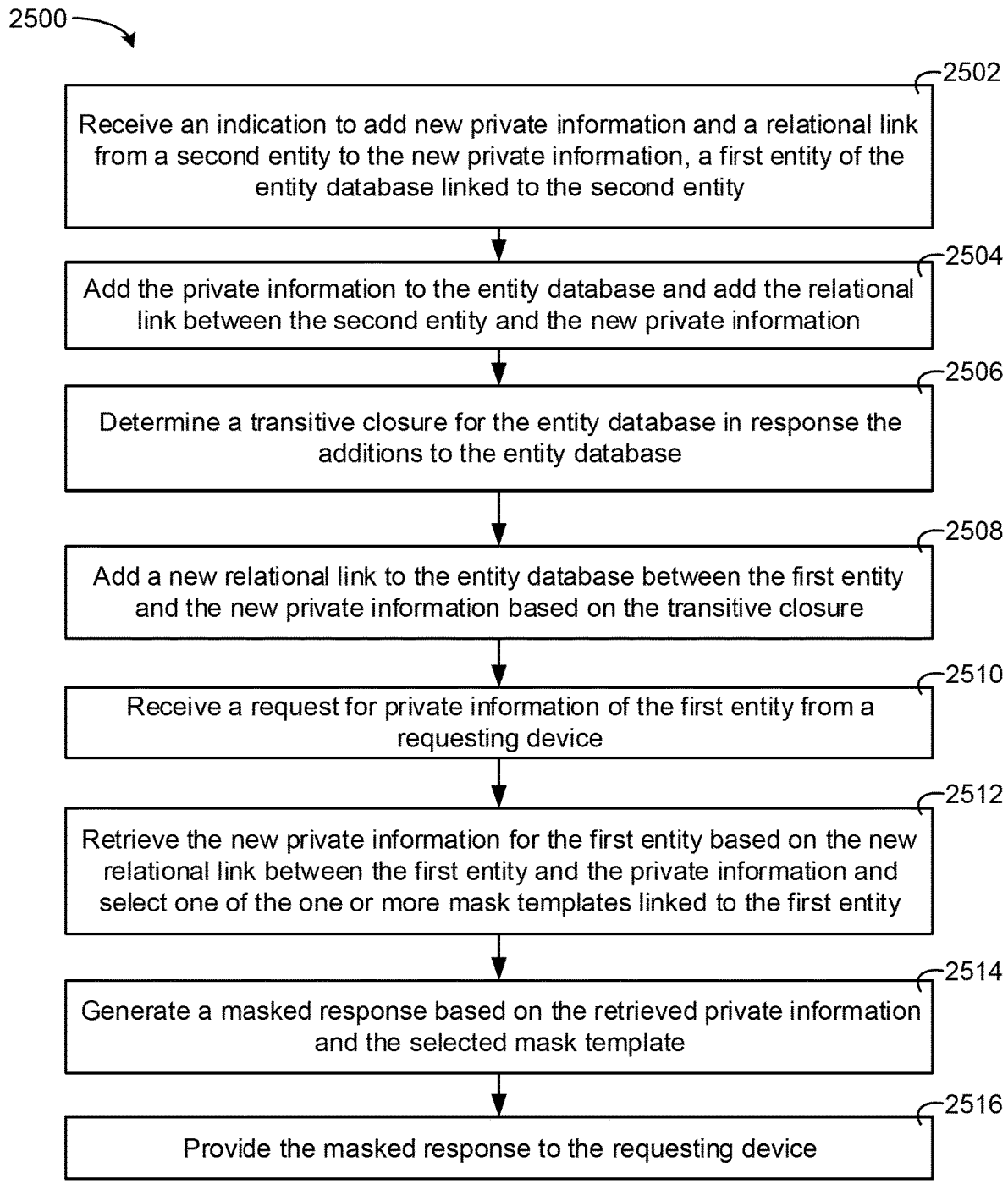
FIG. 25 is a flow diagram of a process for adding the new PII to the entity database of FIGS. 23-24 and determining the transitive closure for the entity database, according to an exemplary embodiment.

Referring now to FIG. 25, a process 2500 for adding new PII to the entity database 1124 and determining a transitive closure to update the entity database 1124 is shown, according to an exemplary embodiment. The cloud entity service 626 is configured to perform the process 2500 in some embodiments. Furthermore, the masking engine 1118, the external interface 1102, the hash manager 1114, and/or the entity database 1124 are configured to perform the process 2500 in some embodiments. Any computing device as described herein can be configured to perform the process 2500.

In step 2502, the cloud entity service 626 can receive an indication to add new private information to the entity database 1124 and a link from a second entity of the entity database 1124 to the private information where a first entity of the entity database 1124 is linked to the second entity. For example, the request may be a request by another system or device as discussed herein, e.g., a request by a database manager of client devices 548. The request may be a request to add the new PII 2308 to the entity database 1124 and a link between the second entity 2306 and the new PII 2308, the relational entity hasA 2310.

In step 2504, the cloud entity service 626 can add the new private information to the entity database 1124 and add a relational link between the second entity and the new private information. For example, the cloud entity service 626 can cause the new PII 2308 to be added to the entity database 1124 and can cause the relational entity hasA 2310 to be added to the entity database 1124.

In step 2506, the cloud entity service 626 can determine a transitive closure for the entity database 1124 in response to adding the additions to the entity database 1124. The transitive closure may indicate direct links which do not currently exist in the entity database 1124. In this regard, in step 2508, the cloud entity service 626 can add new relational links to the entity database 1124 not currently in the entity database 1124 based on the transitive closure. In this example, the cloud entity service 626 can add a new relational link to the entity database between the first entity and the new private information based on the transitive closure determined in the step 2506. In this example, the new relational link is the relational entity hasA 2316 linking the first entity 2304 to the new PII 2308.

In steps 2510-2516, a request for private information of the first entity can be received by the cloud entity service 626 from a requesting device. The cloud entity service can retrieve the new private information for the first entity based on the new relational link between the first entity and the private entity and select one of the one or more mask templates linked to the first entity, generate a masked response based on the retrieved private information and the selected mask template, and provide the masked response to the requesting device. The steps 2510-2516 may be the same and/or similar to the steps 1702-1712 as described with reference to FIG. 17 in the process 1700.

Referring now to FIGS. 26-27, the entity database 1124 is shown where a determination of a transitive closure for the entity database 1124 for new mask templates being added to the entity database 1124 is performed, according to an exemplary embodiment. The cloud entity service 626 can be configured to receive an indication to add new mask templates and link the new mask templates to a second entity of the entity database 626, second entity 2604 (object entity). The request may be received from a database manager via the user devices 536.

In response to the indication, the cloud entity service 626 be configured to add the mask templates 2616 (object entity) and a relational entity (hasA 2614) linking the second entity 2604 to the mask templates 2616. A first entity 2602 (object entity) of the entity database 1124 isRelatedTo 2608 (relational entity) the second entity 2604. Furthermore, the first entity 2602 and the second entity 2604 are both linked to the PII 2612. The first entity 2602 is linked to the PII 2606 via the relational entity hasA 2610 while the second entity 2604 is linked to the PII 2606 via the relational entity hasA 2612.

The cloud entity service 626 can determine a transitive closure for the entity database 1124. In some embodiments, the cloud entity service 626 determines the transitive closure of the entity database 1124 in response to adding the mask templates 2616, based on a user request, and/or at a particular time interval. The cloud entity service 626 can be configured to determine, from the transitive closure, that the entity database 1124 does not include a direct link, i.e., the direct link between the first entity 2602 and the mask templates 2616. In this regard, the cloud entity service 626 can add a link between the first entity 2602 and the mask templates 2616, a relational entity hasA 2618.

In FIG. 27, both the first entity 2602 and the second entity 2604 share the same mask templates 2616 as determined by cloud entity service 626 based on the transitive closure. In this regard, a request for private information of the first entity 2602 or a request for private information of the second entity 2604 (e.g., the PII 2606) can result in a selection of one of the mask templates of the mask templates 2616 as determine by the relational entities hasA 2614 and hasA 2618.

Figure 28:
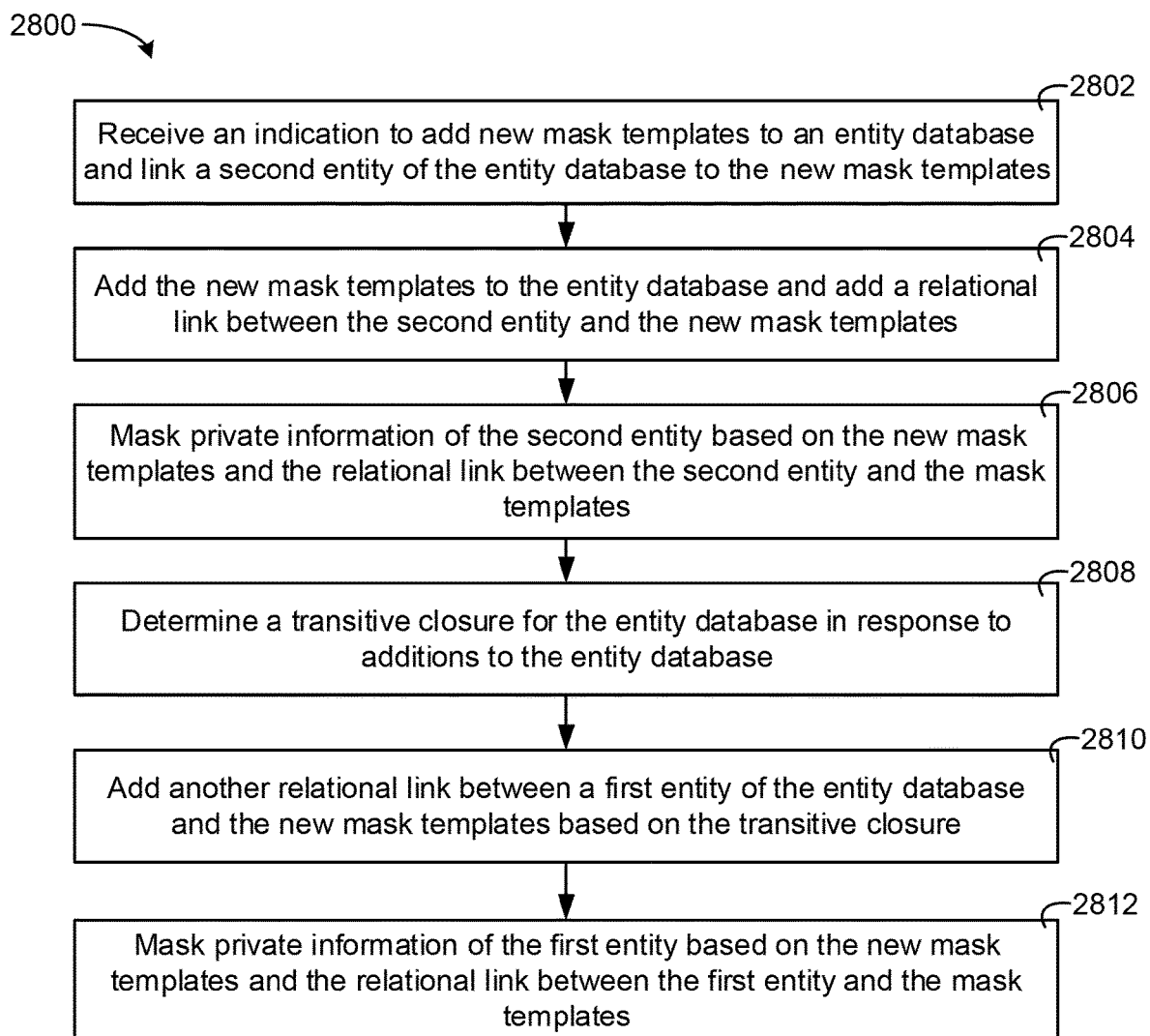
FIG. 28 is a flow diagram of a process for adding the new mask templates to the entity database of FIGS. 26-27 and determining the transitive closure for the entity database, according to an exemplary embodiment.

Referring now to FIG. 28, a process 2800 for adding new mask templates to the entity database 1124 and determining a transitive closure to update the entity database 1124 is shown, according to an exemplary embodiment. The cloud entity service 626 is configured to perform the process 2500 in some embodiments. Furthermore, the masking engine 1118, the external interface 1102, the hash manager 1114, and/or the entity database 1124 are configured to perform the process 2800 in some embodiments. Any computing device as described herein can be configured to perform the process 2800.

In step 2802, the cloud entity service 626 can receive an indication to add new mask templates to the entity database 1124 and to link a second entity of the entity database 1124 to the new mask templates. For example, the cloud entity service 626 can receive a request to add the new mask templates and to link the second entity to the new mask templates from a database manager via the client devices 548. Furthermore, the request may be to add the mask templates 2616 to the entity database 1124 and the relational entity hasA 2614.

In step 2804, based on the receive indication, the cloud entity service 626 can add the new mask templates to the entity database 1124 and link the second entity to the new mask templates. For example, the cloud entity service 626 can add the mask templates 2616 to the entity database 1124 and the relational entity hasA 2614.

In step 2806, the cloud entity service 626 can mask private information of the second entity based on the new mask templates and the relational link between the second entity and the mask templates. For example, if the cloud entity service 626 receives a query for the private information of the second entity 2604 (e.g., the PII 2606), the cloud entity service 626 can determine that the cloud entity service 626 should select a mask from the mask templates 2616 based on the link between the second entity 2604 and the mask templates 2616, hasA 2614.

In step 2808, the cloud entity service 626 can determine a transitive closure for the entity database 1124 in response to the additions to the entity database 1124. The transitive closure may indicate that there are relations between the entities of the entity database 1124 that are not currently reflected in the entity database 1124. For example, the cloud entity service 626 can compare the relations of the entity database 1124 and determine that the transitive closure includes additional relations than the relations that are currently in the entity database 1124.

In step 2810, based on the transitive, the cloud entity service 626 can add additional links between the entities of the entity database, in this example, the cloud entity service 626 can add another relational link between a first entity of the entity database 1124 to the new mask templates. For example, the cloud entity service 626 can determine that the transitive closure indicates a relationship between the first entity 2602 and the mask templates 2616 which does not currently exist in the entity database 1124. In this regard, the cloud entity service 626 can adds the relational entity hasA 2618 linking the first entity 2602 to the mask templates 2616.

In step 2812, the cloud entity service 626 can mask private information of the first entity based on the new mask templates and the relational link between the first entity and the mask templates. For example, since the first entity has been linked to the new mask templates via the transitive closure update, the entity service 626 can select a mask of the new mask templates for masking private information of the first entity. For example, the first entity 2602 hasA 2610 PII 2606 and hasA 2618 mask templates 2616, the relational entity 2618 being added based on the update to the entity database 1124 performed based on the transitive closure. In response to a query for the private information of the first entity 2602, the cloud entity service 626 can retrieve a mask of the mask templates 2616 and mask the PII 2606 based on the retrieved mask.

Physical Transport of Mask Templates Across Systems

Figure 29:
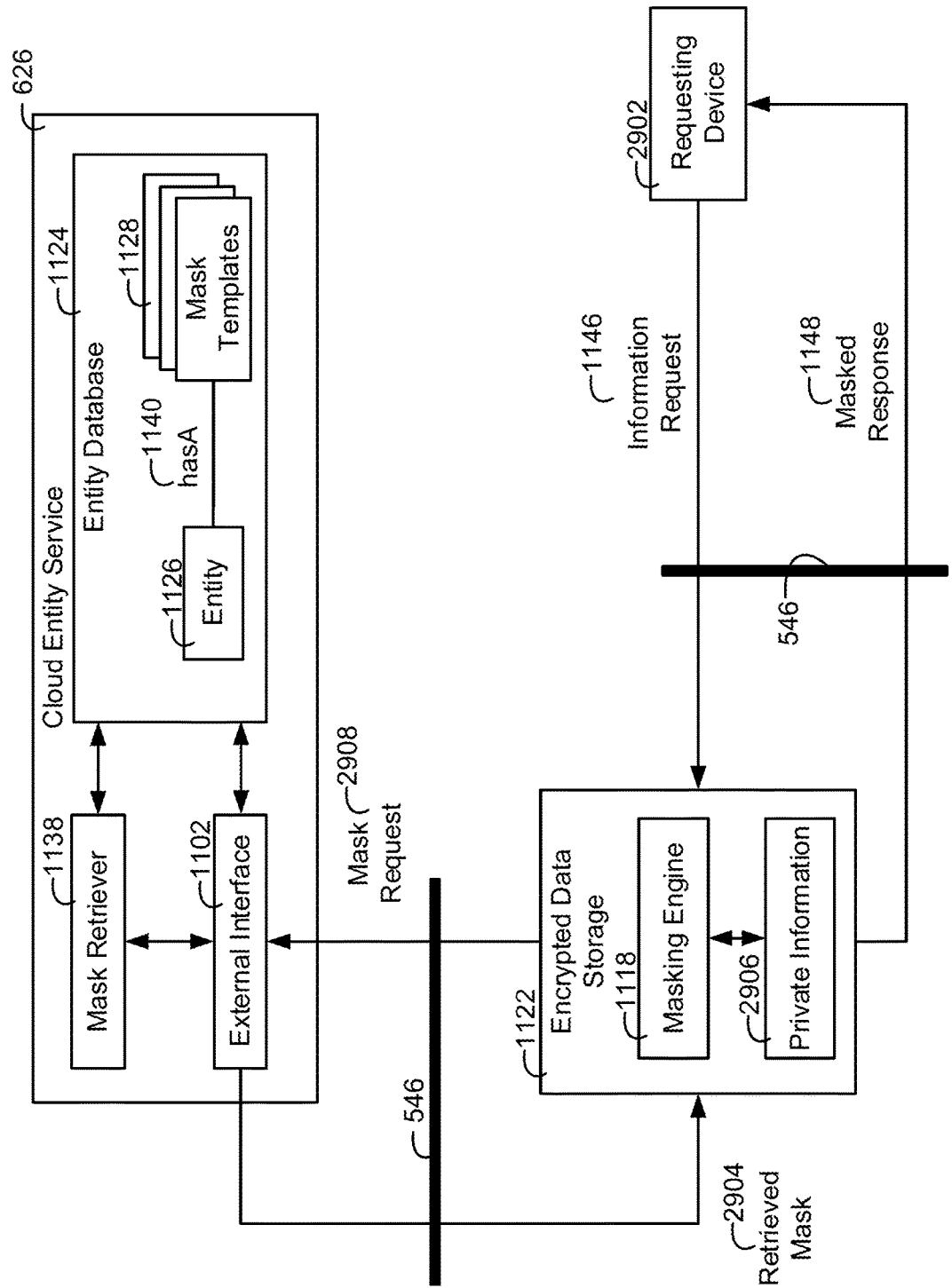
FIG. 29 is a block diagram of the cloud entity service of FIG. 22 transporting a mask template to other systems, according to an exemplary embodiment.

Referring now to FIG. 29, the cloud entity service 626 and the encrypted data storage 1122 are shown as separate systems communicating via the network 546. A requesting device 2902 can be a device that generates a query for private information, the information request 1146 and communicates the information request 1146 to the encrypted data storage 1122 via the network 546. The request device 2902 can be any kind of system, for example, the building management platform 102, the weather service 152, the news service 154, the document service 156, the media service 158, the BMS controller 266, the client devices 548, etc. With respect of FIG. 29, a mask template is transported from the cloud entity service 626 to the encrypted data storage 1122. However, a mask can be transported to any kind of system or device (e.g., database, BMS, thermostat, controller, web server, social media platform, user device, smartphone, etc.)

The encrypted data storage 1122 can be configured to store private information 2906, for example, the private information 1134 and/or any of the PII as described herein. The encrypted data storage 1122 can be configured to retrieve a mask template for the private information 2906 and mask the private information 2906 with the masking engine 1118. The result of the masking may be the masked response 1148. The encrypted data storage 1122 can communicate the masked response 1148 to the requesting device 2902 via the network 546.

To retrieve the mask for masking the private information 2906, the encrypted data storage 1122 can communicate a mask request 2908 for the private information 2906 to the cloud entity service 626 via the network 546. The external interface 1102 can determine, based on the mask request 2908 and the entity database 1124, which mask to retrieve and communicate to the encrypted data storage 1222, i.e., the retrieved mask 2904. In some embodiments, the encrypted data storage 1122 can determine and communicate the hash key 1116 based on the access values 1104 to the cloud entity service 626 via the network 546 for the mask retriever 1138 to retrieve the mask from the mask templates 1128.

In some embodiments, the encrypted data storage 1122 can determine and/or receive the access values 1104 and communicate the access values 1104 to the mask retriever 1138 for mask selection. The encrypted data storage 1122 can receive login credentials from the requesting device 2902 and identify the access values 1104 based on the login credentials or can receive the access values 1104 or an indication of the access values 1104, for example, can receive an IP address of the requesting device 2902. In some embodiments, the cloud entity service 626 can determine the access hash key 1116 and/or the access values 1104 based on the mask request 2908, for example, the mask request 2908 may include credentials of the requesting device 2902 linked to particular access values 1104 stored by the cloud entity service 626.

Figure 30:
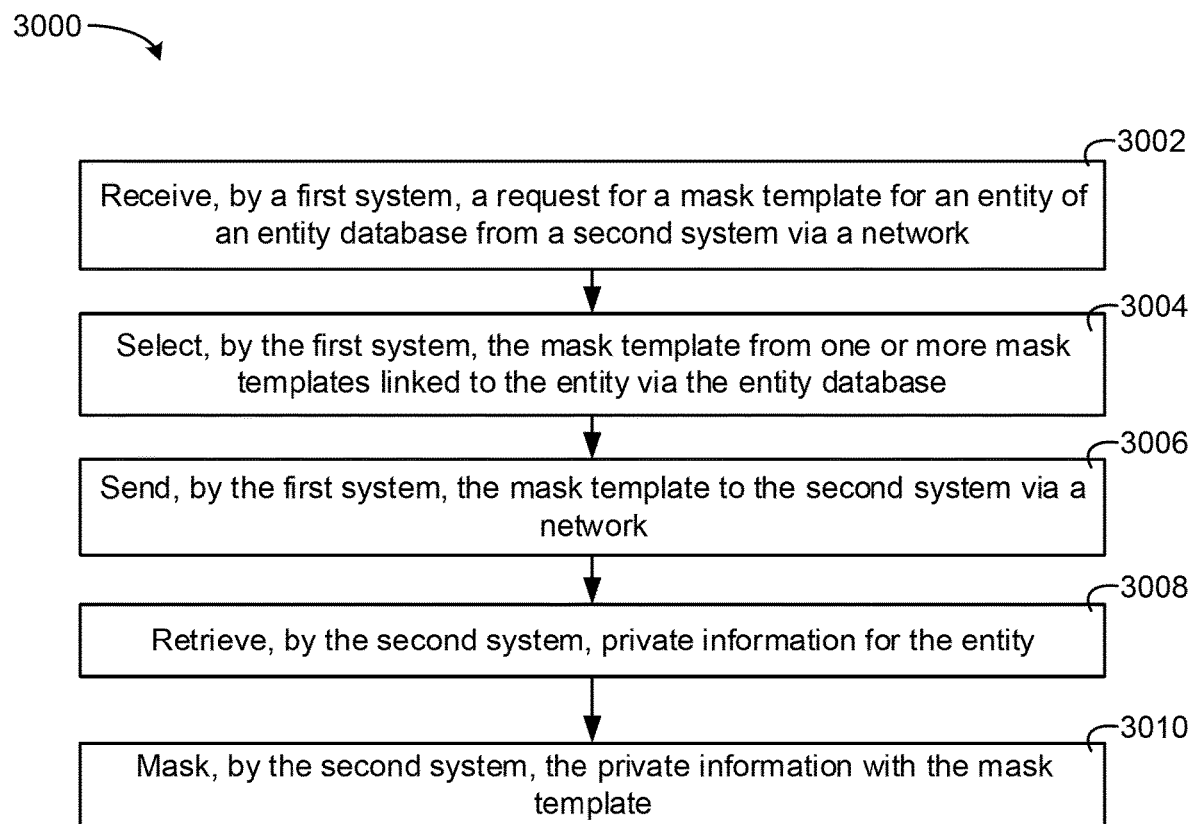
FIG. 30 is a flow diagram of a process for transporting the mask template to the other systems of FIG. 29, according to an exemplary embodiment.

Referring now to FIG. 30, a process 3000 for transporting a mask template to another system is shown, according to an exemplary embodiment. The cloud entity service 626, the encrypted data storage 1122, and/or the requesting device 2902 are configured to perform the process 3000 in some embodiments. Furthermore, the masking engine 1118, the external interface 1102, the hash manager 1114, and/or the entity database 1124 are configured to perform the process 3000 in some embodiments. Any computing device as described herein can be configured to perform the process 3000.

In step 3002, a first system can receive a request for a mask template for an entity of an entity database from a second system via a network. For example, the cloud entity service 626 can receive the mask request 2908 from the encrypted data storage 1122 via the network 546. The request may include an indication of the access values 1104, the access hash key 1116, login credentials, IP addresses, etc. and may indicate which entity of the entity database 1124 the mask template request is for.

In step 3004, the first system can select the mask template from one or more mask templates linked to the entity via the entity database. For example, based on the indication of the access values 1104, the access hash key 1116, the login credentials, and/or the indication of the entity, the mask retriever 1138 can retrieve a mask from the mask templates

1128. In step 3006, the first system can send the mask template to the second system via the network 546, e.g., the cloud entity service 626 can send the retrieved mask 2904 to the encrypted data storage 1122 via the network 546.

In step 3008, the second system can retrieve private information for the entity. For example, the encrypted data storage 1122 can retrieve the private information 2906. In some embodiments, the private information 2906 is stored by the encrypted data storage 1122 and the masking engine 1118 can retrieve the private information 2906 stored by the encrypted data storage 1122. In some embodiments, the encrypted data storage 1122 communicates to another system that stores the private information 2906 and retrieves the private information 2906 from that system. In step 3010, based on the mask template, the second system can mask the private information with the mask template. For example, the masking engine 1118 can mask the private information 2906 based on the retrieved mask 2904. Masking the private information 2906 may be the same and/or similar to the masking as described with reference to FIGS. 11-18.

Security Equipment Operation, Environmental Building Control, and User Interfaces Via Mask Templates Referring generally to FIGS. 11-30, various implementations of the masking of private information via mask templates of an entity database can be implemented to mask attribute level information. One implementation of the masking of private information may be in an HVAC system. For the HVAC system, the BMS controller 466 that operates to control physical building conditions (e.g., temperature, humidity, air quality, etc.) based on measurements, can operate to control building equipment to control the physical building conditions based on masked data. For example, in some embodiments, the cloud entity service 626 receives timeseries data for temperature of a space of a building from a thermostat. PII linked to a thermostat entity representing the thermostat can be the timeseries temperature data. The timeseries temperature data can include both a communications address of the thermostat and a temperature measurement of the thermostat.

In some embodiments, the cloud entity service 626 can provide the temperature timeseries data to the BMS controller 546 in response to receiving a request for the timeseries data and/or data of the thermostat. However, based on a mask and various access values associated with the BMS controller 546, the cloud entity service 626 can mask the timeseries data such that the thermostat address is removed and only the temperature values are retained. In this regard, the BMS controller 466 can continue to operate the physical conditions of the building but is not exposed to private information of the thermostat.

As another example, a user can be linked to biometric data, the data can include an image of a face and a fingerprint. A facial recognition access system can query the cloud entity service 626 for the biometric data of the user to determine whether to allow the user to enter the building (e.g., operate doors, turn styles, etc.). The cloud entity service 626 can determine, based on a selected mask template, to hide the fingerprint data from the masked data that the cloud entity service 626 provides to the facial recognition access system since the facial recognition access system may only require the facial image of the user and exposing the fingerprint to the user would be providing the facial recognition access system with unnecessary information. Based on the facial image, the facial recognition access system can operate doors, turn styles, etc. when the user is detected. However, for a fingerprint based access system of another building, the cloud entity service 626 can mask the facial image of the user when providing information to the fingerprint based access system.

Furthermore, the masked information generated by the cloud entity service 626 can be provided to end users via user interfaces. For example, a doctor may wish to pull-up personal information for a particular user, e.g., a medical history. The cloud entity service 626 can mask the medical history of the user and provide the history to the doctor via a user device (e.g., a cellphone, a tablet, a laptop, etc.). However, for a school teacher requesting the medical history of the user (e.g., a student), the cloud entity service 626 can provide a masked data structure to a user device of the school teacher that displays the medical history masked. For example, the doctor may gain all access to the medical history of the user while the school teacher may only gain access to life threatening medical conditions or prescriptions of the student.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building system for operating a building and managing private building information, the building system comprising a processing circuit configured to:
    receive a request for information for a building entity of a building entity database, wherein the building entity database comprises the building entity, a plurality of mask templates, and a relational link between the building entity and the plurality of mask templates;
    select one of the plurality of mask templates from the building entity database based on a plurality of access values and the relational link between the building entity and the plurality of mask templates;
    retrieve private information for the building entity in response to a reception of the request for the information; and
    generate a masked information data structure based on the private information and the one of the plurality of mask templates.

2. The building system of claim 1, wherein the processing circuit is configured to operate one or more pieces of building equipment to operate the building based on the masked information data structure.

3. The building system of claim 1, wherein the processing circuit is configured to select the one of the plurality of mask templates by selecting the one of the plurality of mask templates as a function of the plurality of access values.

4. The building system of claim 1, wherein each of the plurality of mask templates is associated with a particular combination of values of the plurality of access values;
    wherein the processing circuit is configured to select the one of the plurality of mask templates by selecting the one of the plurality of mask templates based on the particular combination of values of the plurality of access values by identifying the one of the plurality of mask templates associated with the particular combination of the values of the plurality of access values.

5. The building system of claim 1, wherein the processing circuit is configured to:
    determine whether the request for information is a request for the private information or a request for public information; and
    retrieve the public information and provide the public information to a requesting device without masking in response to a determination that the request for the information is the request for the public information;
    wherein the processing circuit is configured to retrieve the private information for the building entity in response to the reception of the request for the information and in response to a determination that the request for the information is the request for the private information;
    wherein the processing circuit is configured to generate the masked information data structure based on the private information and the selected one of the plurality of mask templates in response to the determination that the request for the information is the request for the private information.

6. The building system of claim 1, wherein the private information comprises a plurality of attributes of the building entity;
    wherein each of the plurality of mask templates comprises a plurality of masking operators, one of the plurality of masking operators associated with each of the plurality of attributes;
    wherein the plurality of masking operators comprise at least one of:
        a masking operator configured to replace one or more values of a particular attribute with a particular masking character;
        a masking operator configured to show the particular attribute in the clear;
        a masking operator configured to show only a particular number of a plurality of values of the particular attribute; or
        a masking operator configured to apply a particular encryption method on the particular attribute.

7. The building system of claim 1, wherein the plurality of access values comprise at least one of:
    role information of a user of a requesting device, wherein the role information indicates a permission level of the user;
    a device type of the requesting device;
    a geographic location of the requesting device;
    an application of the requesting device associated with generating the request for private information; or
    a vertical identifying a business use associated with the requesting device.

8. The building system of claim 1, wherein the processing circuit is configured to:
    receive a mask template request from a second system, the second system configured to store the private information and mask the private information based on a mask template received from the building system;
select a second mask template of the plurality of mask templates based on the mask template request received from the second system; and
send the second mask template to the second system for masking, by the second system, the private information stored by the second system.

9. The building system of claim 1, wherein the processing circuit is configured to generate an access hash key based on the plurality of access values;
wherein the processing circuit is configured to select the one of the plurality of mask templates from the building entity database based on the plurality of access values by selecting the one of the plurality of mask templates with the access hash key, wherein each of the plurality of mask templates is associated with a particular value of the access hash key.

10. The building system of claim 9, wherein the processing circuit is configured to generate the access hash key by concatenating the plurality of access values and hashing the concatenated plurality of access values to generate the access hash key.

11. The building system of claim 1, wherein the processing circuit is configured to:
determine a transitive closure for the building entity database based on a set of entities of the building entity database and a set of relational links between entities of the set of entities, the set of entities comprising at least the building entity, the plurality of mask templates, and the private information; and
update the building entity database based on the transitive closure by adding additional relational links between the entities of the set of entities, the additional relational links comprising at least one of the relational link between the building entity and the one or more mask templates and a relational link between the building entity and the private information;
wherein the processing circuit is configured to retrieve the private information for the building entity in response to the reception of the request for the information based on the relational link between the building entity and the private information.

12. The building system of claim 11, wherein the processing circuit is configured to:
receive new entity data, the new entity data comprising at least one of a new building entity and a new link between the new building entity and at least one of the entities of the set of entities, new private information and a new link between the new private information and at least one of the entities of the set of entities, or new mask templates and a new link between the new mask templates and at least one of the entities of the set of entities;
add the new entity data to the building entity database;
determine the transitive closure of the building entity database based on the set of entities, the set of relational links, and the new entity data added to the building entity database; and
update the building entity database by updating the set of relational links based on the transitive closure by adding new direct relational links between the entities of the set of entities to the set of relational links.

13. The building system of claim 1, wherein the building entity database comprises a second building entity and one or more links relating the building entity to the second building entity and the second building entity to the building entity;
wherein the processing circuit is configured to:
receive a second request for the private information for the building entity and second private information for a second entity linked to the building entity;
determine whether a requesting device has access to the second private information of the second entity linked to the building entity and the private information of the building entity based on the plurality of access values;
generate a second masked information data structure based on the second private information and a second mask template; and
provide the second masked information data structure to the requesting device in response the reception of the request for the private information and the second private information and in response to a determination that the requesting device has access to the second private information of the second entity linked to the building entity and the private information of the building entity based on the plurality of access values.

14. The building system of claim 13, wherein the building entity database comprises one or more access control lists (ACLs) linked to at least one of the building entity or the second building entity, wherein the one or more ACLs indicate whether a role indicated by the plurality of access values is associated with access to the second private information of the second building entity linked to the building entity and the private information of the building entity;
wherein the processing circuit is configured to determine whether the requesting device has access to the second private information of the second building entity linked to the building entity and the private information of the building entity based on the role indicated by the plurality of access values and the one or more ACLs.

15. The building system of claim 13, wherein the building entity database comprises a second plurality of mask templates and one or more links associating the second plurality of mask templates with the second building entity;
wherein the processing circuit is configured to generate the second masked information data structure based on the second private information and the second mask template by:
selecting the second mask template from the second plurality of mask templates based on the plurality of access values; and
applying one or more masking operators of the second mask template to attributes of the second private information.

16. The building system of claim 15, wherein at least some of the plurality of mask templates and the second plurality of mask templates are same mask templates.

17. A method for managing private information of a building entity database, the method comprising:
receiving, by a processing circuit, a request for information for a building entity of the building entity database from a requesting device, wherein the building entity database comprises the building entity, a plurality of mask templates, and a relational link between the building entity and the plurality of mask templates;
selecting, by the processing circuit, one of the plurality of mask templates from the building entity database based on a plurality of access values associated with the requesting device and the relational link between the building entity and the plurality of mask templates;

retrieving, by the processing circuit, private information for the building entity in response to a reception of the request for the information;

generating, by the processing circuit, a masked information data structure based on the private information and the one of the plurality of mask templates; and providing, by the processing circuit, the masked information data structure to the requesting device in response to the reception of the request for the information.

18. The method of claim 17, wherein selecting, by the processing circuit, the one of the plurality of mask templates comprises selecting the one of the plurality of mask templates as a function of the plurality of access values based on a particular combination of values of the plurality of access values by identifying the one of the plurality of mask templates associated with the particular combination of the values of the plurality of access values;

wherein each of the plurality of mask templates is associated with a particular combination of values of the plurality of access values.

19. The method of claim 17, wherein the private information comprises a plurality of attributes of the building entity;

wherein each of the plurality of mask templates comprises a plurality of masking operators, one of the plurality of masking operators associated with each of the plurality of attributes;

wherein the plurality of masking operators comprise at least one of:

a masking operator configured to replace one or more values of a particular attribute with a particular masking character;

a masking operator configured to show the particular attribute in the clear;

a masking operator configured to show only a particular number of a plurality of values of the particular attribute; or a masking operator configured to apply a particular encryption method on the particular attribute.

20. The method of claim 17, wherein the plurality of access values comprise at least one of:

role information of a user of the requesting device, wherein the role information indicates a permission level of the user;

a device type of the requesting device;

a geographic location of the requesting device;

an application of the requesting device associated with generating the request for private information; or a vertical identifying a business use associated with the requesting device.

* * * * *